(12) United States Patent
Hamada et al.

(10) Patent No.: US 8,197,710 B2
(45) Date of Patent: *Jun. 12, 2012

(54) POLYMERIZABLE COMPOUND AND POLYMERIZABLE COMPOSITION

(75) Inventors: Rieko Hamada, Saitama (JP);
Masatomi Irisawa, Saitama (JP);
Kiyoshi Murata, Saitama (JP)

(73) Assignee: Adeka Corporation, Tokyo (JP)

( * ) Notice: Subject to any disclaimer, the term of this patent is extended or adjusted under 35 U.S.C. 154(b) by 203 days.

This patent is subject to a terminal disclaimer.

(21) Appl. No.: 12/446,299

(22) PCT Filed: Oct. 9, 2007

(86) PCT No.: PCT/JP2007/069701
§ 371 (c)(1),
(2), (4) Date: Apr. 20, 2009

(87) PCT Pub. No.: WO2008/081631
PCT Pub. Date: Jul. 10, 2008

(65) Prior Publication Data
US 2010/0294990 A1 Nov. 25, 2010

(30) Foreign Application Priority Data

Dec. 29, 2006 (JP) .................. 2006-356840
Jan. 9, 2007 (JP) .................. 2007-001727

(51) Int. Cl.
*C09K 19/00* (2006.01)
*C09K 19/06* (2006.01)
*C09K 19/36* (2006.01)
*C07C 69/76* (2006.01)
*C08G 63/00* (2006.01)

(52) U.S. Cl. ........... 252/299.62; 252/299.01; 252/299.6; 252/299.67; 252/299.7; 428/1.1; 560/76; 560/80; 560/95; 525/8; 525/81; 525/94; 526/242; 526/320

(58) Field of Classification Search ............. 252/299.01, 252/299.6, 299.62, 299.67, 299.7; 428/1.1; 560/76, 80, 95; 525/8, 81, 94; 526/242, 526/320
See application file for complete search history.

(56) References Cited

U.S. PATENT DOCUMENTS

| | | | |
|---|---|---|---|
| 4,452,993 | A | 6/1984 | Conciatori et al. |
| 4,983,479 | A | 1/1991 | Broer et al. |
| 5,024,850 | A | 6/1991 | Broer et al. |
| 5,833,880 | A | 11/1998 | Siemensmeyer et al. |
| 7,931,825 | B2 * | 4/2011 | Irisawa et al. ............ 252/299.01 |
| 2004/0222403 | A1 | 11/2004 | Sasada et al. |
| 2007/0228326 | A1 | 10/2007 | Goldfinger et al. |
| 2007/0282087 | A1 | 12/2007 | Irisawa et al. |

FOREIGN PATENT DOCUMENTS

| | | |
|---|---|---|
| JP | 02-006927 | 1/1990 |
| JP | 03-021904 | 1/1991 |
| JP | 06-016616 | 1/1994 |
| JP | 06-240260 | 8/1994 |
| JP | 11-021269 | 1/1999 |
| JP | 11-513360 | 11/1999 |
| JP | 2003-313250 | 11/2003 |
| JP | 2004-231638 | 8/2004 |
| JP | 2005-521538 | 7/2005 |
| JP | 2005-309255 | 11/2005 |
| JP | 2007-121996 | 5/2007 |
| WO | 95/24454 | 9/1995 |
| WO | 95/24455 | 9/1995 |
| WO | 2006/049111 | 5/2006 |
| WO | 2006/120220 | 11/2006 |
| WO | 2007/052403 | 5/2007 |
| WO | 2007/080702 | 7/2007 |
| WO | 2007/120458 | 10/2007 |

OTHER PUBLICATIONS

European Patent Office issued an European Search Report dated Mar. 15, 2010, Application No. 07829439.4.
Japanese Official Action—200780038823.1—Jul. 8, 2010.

* cited by examiner

*Primary Examiner* — Geraldina Visconti
(74) *Attorney, Agent, or Firm* — Young & Thompson

(57) ABSTRACT

A polymerizable compound represented by general formula (1):

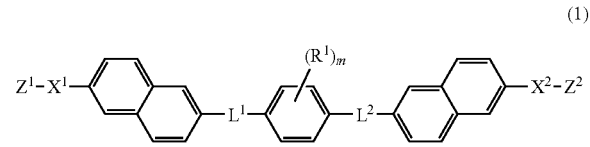

(1)

wherein $Z^1$ and $Z^2$ each represent a (meth)acryloyloxy group; $X^1$ and $X^2$ each independently represent a single bond, an optionally branched alkylene group having 1 to 8 carbon atoms, an ether linkage, —COO—, —OCO—, —OCOO—, a 6-membered ring optionally having a substituent, or a combination thereof; $R^1$ represents —R', —OR', —CO—R', or —OCO—R'; R' represents a halogen atom, an optionally branched alkyl group having 1 to 8 carbon atoms, or a 6-membered ring optionally having a substituent, $L^1$ and $L^2$ each independently represent a member selected from a single bond, —CH$_2$CH$_2$—, —CH=CH—, —C≡C—, —CH$_2$O—, —OCH$_2$—, —COO—, and —OCO—; m represents an integer of 1 to 4; and the $R^1$'s may be the same or different.

17 Claims, No Drawings

POLYMERIZABLE COMPOUND AND POLYMERIZABLE COMPOSITION

TECHNICAL FIELD

This invention relates to a polymerizable compound having one substituted benzene ring and two naphthalene rings linearly bonded to each other and a polymerizable composition containing the polymerizable compound. The polymerizable composition polymerizes with good control in thin film formation, good retention of liquid crystal alignment, and curability to provide a polymer useful as an optical element, such as an optical film for a display device and a polarizing prism.

BACKGROUND ART

Liquid crystals are applied to display media in which the reversible movement of liquid crystal molecules is made use of, such as display devices typically of TN or STN mode. Besides the application to display media, the liquid crystals have been studied for applicability to optically anisotropic materials or elements, such as a retardation film, a polarizer, a polarizing prism, a luminance-improving film, a low pass filter, and various optical filters, taking advantage of their anisotropy in physical properties, such as refractive index, dielectric constant, magnetic susceptibility, elastic modulus, and thermal expansion coefficient, as well as their alignment properties.

Retardation R of an optically anisotropic material, which relates to its anisotropy contrast, is represented by formula: $R = \Delta n \cdot d$ (n is optical (refractive index) anisotropy, and d is thickness). Since R should be set at a specific value, an increase in $\Delta n$ allows a decrease in d. Thickness reduction of an optically anisotropic film makes it easy to control the alignment of liquid crystal molecules during polymerization, which will lead to improvements in yield and efficiency of the optically anisotropic element production.

The optically anisotropic material is obtained by, for example, uniformly aligning the molecules of a liquid crystal compound having a polymerizable functional group or a polymerizable composition containing the liquid crystal compound into a liquid crystal phase and irradiating the compound or the composition being in the liquid crystal phase with energy rays, such as ultraviolet rays, to cause photopolymerization. It is required to fix the aligned state of the liquid crystal compound uniformly and semi-permanently.

When the polymerizable composition has a high liquid crystal phase transition temperature, photopolymerization induced by energy rays may unintentionally invite thermal polymerization, which disturbs the uniform alignment of the liquid crystal molecules, making it difficult to fix a desired state of alignment. In order to facilitate temperature control during cure, a polymerizable composition showing a liquid crystal phase at or near room temperature is demanded.

The polymer is obtained by polymerizing the polymerizable composition in the form of coating film applied to a substrate. If the composition contains a non-polymerizable compound, the resulting polymer film may have insufficient strength or contain residual stress-induced strain. Removing a non-polymerizable compound using, e.g., a solvent can result in a failure to retain film homogeneity and cause unevenness. To obtain a polymer film with a uniform thickness, it is therefore preferred to apply a polymerizable composition in the form of a solution in a solvent to a substrate. Hence, it is desirable for a liquid crystal compound or a polymerizable composition containing it to have good solubility in a solvent.

A polymerizable liquid crystal compound having a (meth)acrylic group as a polymerizable functional group exhibits high polymerization reactivity, and the resulting polymer has high transparency and has therefore been extensively studied for use as an optically anisotropic material.

Compounds having a (meth)acryloyloxy group as a (meth) acrylic polymerizable group include a monomer having a phenylene group and/or a cyclohexyl group disclosed in Patent document 1, a reactive liquid crystal compound having a cyano-substituted phenylene group disclosed in Patent document 2, a nematic liquid crystal composition containing a diacrylate compound disclosed in Patent document 3, a mixture of a liquid crystal compound having a phenylene group disclosed in Patent document 4, and a compound obtained by the reaction of a mesogenic diol compound with a (meth)acryloyloxy group disclosed in Patent document 5.

In general, formation of a thick film from a polymerizable composition containing a liquid crystal compound encounters with difficulty in controlling molecular alignment of the liquid crystal compound, which can cause problems, such as reduction in transmittance and coloration. On the other hand, a thin polymer film having satisfactory molecular alignment over the entire area thereof can be obtained, but formation of a thin film has difficulty in thickness control, readily resulting in non-uniform surface condition or crystallization. Furthermore, the liquid crystal state resulting from alignment control in film formation is instable and tends to be disturbed before curing by irradiation with, e.g., UV light. Conventional known polymerizable compositions have thus failed to provide a satisfactory polymer.

Patent document 1: JP 2-6927A
Patent document 2: JP 6-16616A
Patent document 3: JP 6-240260A
Patent document 4: JP 11-513360A
Patent document 5: JP 2005-521538A

DISCLOSURE OF THE INVENTION

Problem to be Solved by the Invention

An object of the invention is to provide a polymerizable compound exhibiting large optical (refractive index) anisotropy ($\Delta n$), a liquid crystal phase at and near room temperature, and good solvent solubility and a polymerizable composition containing the polymerizable compound, which provide, upon curing, a polymer with uniformly controlled film thickness, high heat resistance, well controlled alignment, and excellent optical characteristics.

Means for Solving the Problem

The present inventors have conducted extensive investigations and found, as a result, that the above object of the invention is accomplished by using a polymerizable compound having a specific chemical structure. The present invention has thus been completed.

The above object of the invention is accomplished by the provision of a polymerizable compound represented by general formula (1):

[Formula 1]

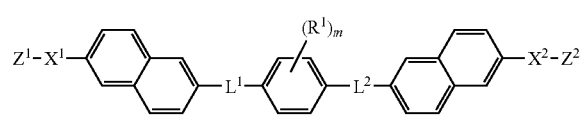

(1)

wherein $Z^1$ and $Z^2$ each represent a (meth)acryloyloxy group; $X^1$ and $X^2$ each independently represent a single bond, an optionally branched alkylene group having 1 to 8 carbon atoms, an ether linkage, —COO—, —OCO—, —OCOO—, a 6-membered ring optionally having a substituent, or a combination thereof; $R^1$ represents —R', —OR', —CO—R', or —OCO—R'; R' represents a halogen atom, an optionally branched alkyl group having 1 to 8 carbon atoms, or a 6-membered ring optionally having a substituent; wherein the alkyl group may have its —$CH_2$— moiety replaced with a sulfur atom or an oxygen atom and may have its hydrogen atom replaced with a halogen atom or a nitrile group; the substituent is selected from a hydrogen atom, a halogen atom, a nitrile group, an optionally branched alkyl group having 1 to 8 carbon atoms, an optionally branched alkoxy group having 1 to 8 carbon atoms, an optionally branched alkenyl group having 2 to 8 carbon atoms, wherein the alkyl, alkoxy or alkenyl group may have its —$CH_2$— moiety replaced with a sulfur atom or an oxygen atom and may have its hydrogen atom replaced with a halogen atom or a nitrile group; $L^1$ and $L^2$ each independently represent a member selected from a single bond, —$CH_2CH_2$—, —CH=CH—, —C≡C—, —$CH_2O$—, —$OCH_2$—, —COO—, and —OCO—; m represents an integer of 1 to 4; and the $R^1$'s may be the same or different.

The invention also provides an embodiment of the polymerizable compound, in which $L^1$ is —COO—, and $L^2$ is —OCO—:

The invention also provides another embodiment of the polymerizable compound, in which $Z^1$—$X^1$— and $Z^2$—$X^2$— are each a structure represented by formula (2):

[Formula 2]

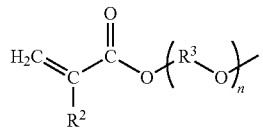

(2)

wherein $R^2$ represents a hydrogen atom or a methyl group; $R^3$ represents a single bond, an optionally branched alkylene group having 1 to 8 carbon atoms, or an optionally branched alkylene group having 2 to 8 carbon atoms interrupted by an ether linkage and/or an ester linkage; n represents an integer of 0 to 5; and, when n is 2 or greater, the $R^3$'s may be the same or different.

The invention also provides a polymerizable composition containing the polymerizable compound of the invention.

The invention also provides an embodiment of the polymerizable composition, wherein the composition further contains a liquid crystal compound.

The invention also provides another embodiment of the polymerizable composition, wherein the composition further contains an optically active compound and has a cholesteric liquid crystal phase.

The invention also provides still another embodiment of the polymerizable composition, wherein the composition further contains a radical polymerization initiator.

The invention also provides a polymer obtained by photopolymerizing the polymerizable composition of the invention.

The invention also provides an embodiment of the polymer, wherein the polymer has optical anisotropy.

The invention also provides an optical film for display devices that is formed of the polymer of the invention.

BEST MODE FOR CARRYING OUT THE INVENTION

The polymerizable compound according to the invention, the polymerizable composition of the invention that contains the polymerizable compound, and the polymer of the invention that is obtained by photopolymerizing the polymerizable composition will be described in detail with reference to their preferred embodiments.

The polymerizable compound according to the invention will be described first.

Examples of the optionally branched alkylene group having 1 to 8 carbon atoms as represented by $X^1$ and $X^2$ in general formula (1) include methylene, ethylene, propylene, methylethylene, butylene, 1-methylpropylene, 2-methylpropylene, 1,2-dimethylpropylene, 1,3-dimethylpropylene, 1-methylbutylene, 2-methylbutylene, 3-methylbutylene, 4-methylbutylene, 2,4-dimethylbutylene, 1,3-dimethylbutylene, pentylene, hexylene, heptylene, and octylene.

Examples of the optionally branched alkyl group having 1 to 8 carbon atoms as represented by R' in general formula (1) include methyl, ethyl, propyl, isopropyl, butyl, sec-butyl, tert-butyl, isobutyl, amyl, isoamyl, tert-amyl, hexyl, 2-hexyl, 3-hexyl, heptyl, 2-heptyl, 3-heptyl, isoheptyl, tert-heptyl, n-octyl, isooctyl, tert-octyl, and 2-ethylhexyl.

The optionally substituted 6-membered ring as represented by $X^1$, $X^2$, and R' in general formula (1) is a benzene ring or a cyclohexane ring. The benzene or cyclohexane ring may have its carbon atom replaced with a nitrogen atom or a sulfur atom. Examples of a nitrogen-containing 6-membered ring include pyridine, pyrazine, pyrimidine, pyridazine, triazine, piperidine, and piperazine. Examples of a sulfur-containing 6-membered ring are thiopyran and thiopyrylium.

Examples of the substituent the 6-membered ring may have include an optionally branched alkyl group having 1 to 8 carbon atoms, an optionally branched alkoxy group having 1 to 8 carbon atoms, an optionally branched alkenyl group having 2 to 8 carbon atoms. The —$CH_2$— moiety of the alkyl, alkoxy or alkenyl group may be replaced with a sulfur atom or an oxygen atom, and the hydrogen atom of the alkyl, alkoxy or alkenyl group may be replaced with a halogen atom or a nitrile group.

Examples of the optionally branched alkyl group having 1 to 8 carbon atoms include those recited above with respect to R' in general formula (1).

Examples of the optionally branched alkoxy group having 1 to 8 carbon atoms include methyloxy, ethyloxy, chloromethyloxy, trifluoromethyloxy, cyanomethyloxy, ethyloxy, dichloroethyloxy, propyloxy, isopropyloxy, butyloxy, sec-butyloxy, tert-butyloxy, isobutyloxy, amyloxy, isoamyloxy, tert-amyloxy, hexyloxy, cyclohexyloxy, heptyloxy, isoheptyloxy, tert-heptyloxy, n-octyloxy, isooctyloxy, tert-octyloxy, and 2-ethylhexyloxy.

Examples of the optionally branched alkenyl group having 2 to 8 carbon atoms include vinyl, propenyl, isopropenyl, butenyl, isobutenyl, and octenyl.

Preferred of the polymerizable compounds of the invention are those of general formula (1) wherein $L^1$ is —COO—, and $L^2$ is —OCO— because of their broad range of temperature for transition to a liquid crystal phase and excellent solvent solubility. Also preferred are those in which $Z^1$—$X^1$— and $Z^2$—$X^2$— are represented by formula (2) because of their liquid crystal alignment controllability as well as the above-described characteristics.

Specific examples of the polymerizable compound represented by general formula (1) include, but are not limited to, compound Nos. 1 through 64 below.

[Formula 3]
Compound No. 1
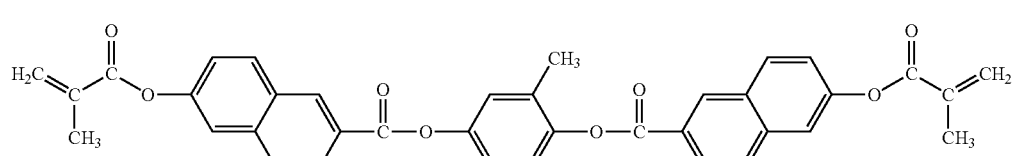
[Formula 4]
Compound No. 2
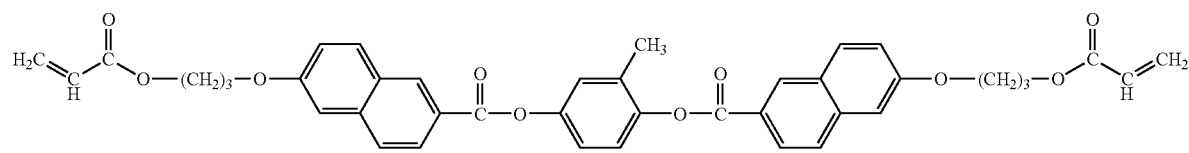
[Formula 5]
Compound No. 3
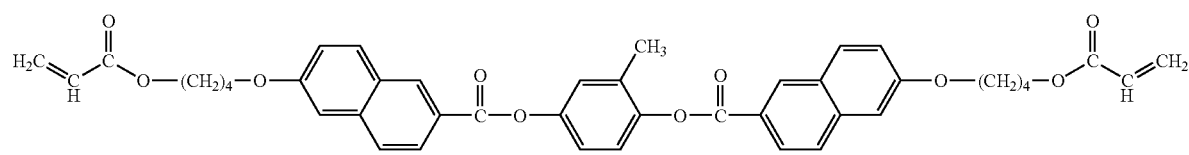
[Formula 6]
Compound No. 4
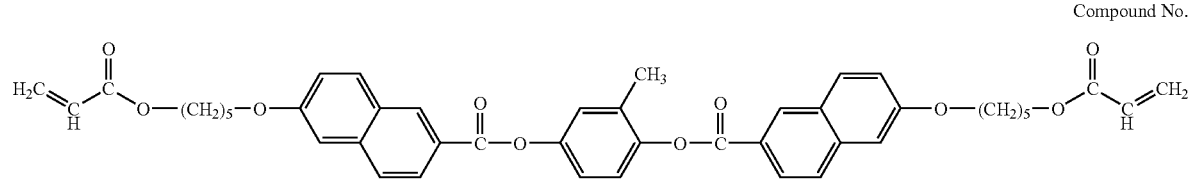
[Formula 7]
Compound No. 5
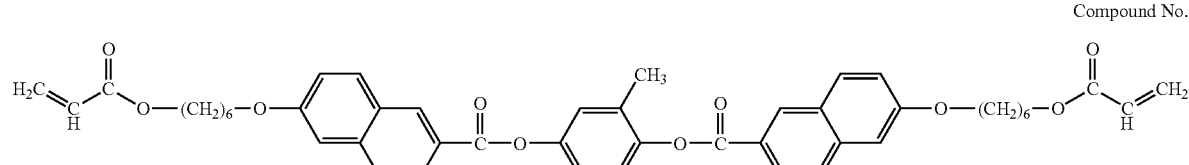
[Formula 8]
Compound No. 6
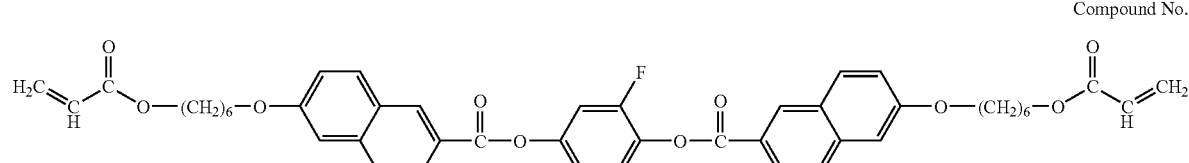
[Formula 9]
Compound No. 7
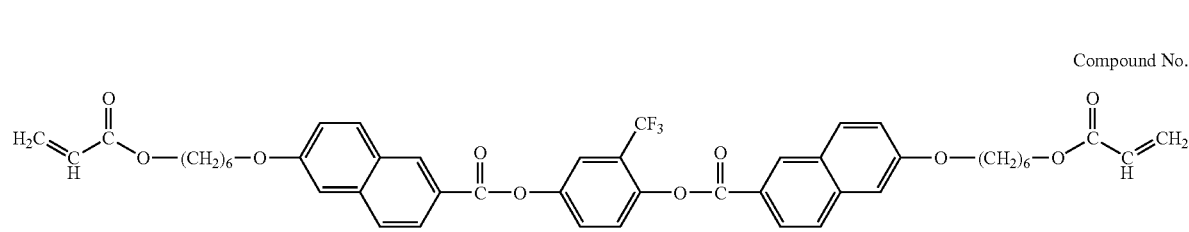

-continued
[Formula 10]
Compound No. 8
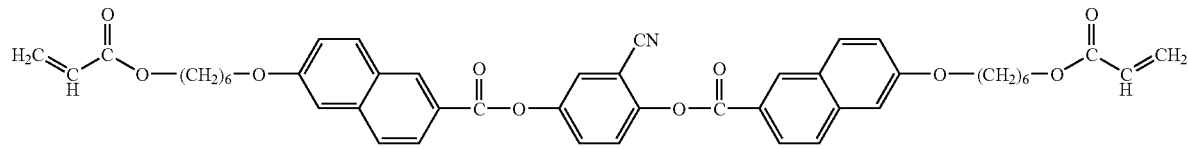
[Formula 11]
Compound No. 9
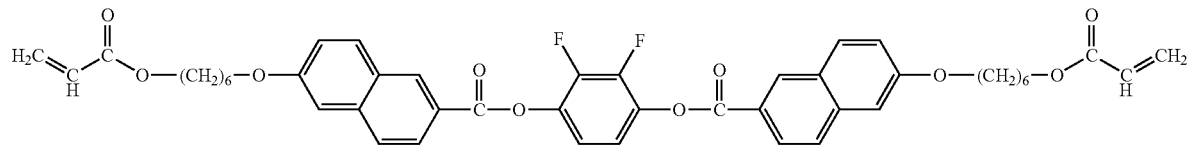
[Formula 12]
Compound No. 10
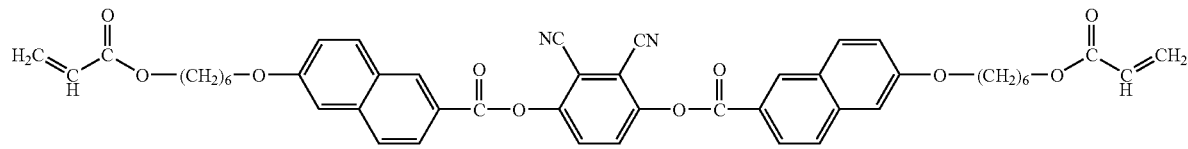
[Formula 13]
Compound No. 11
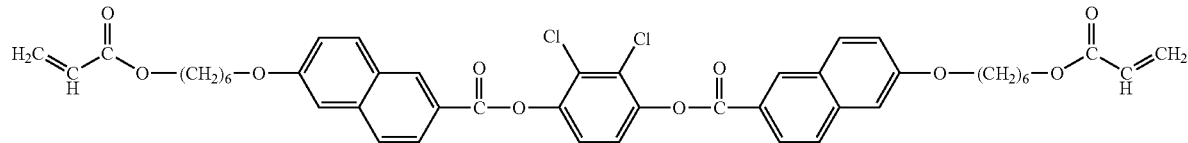
[Formula 14]
Compound No. 12
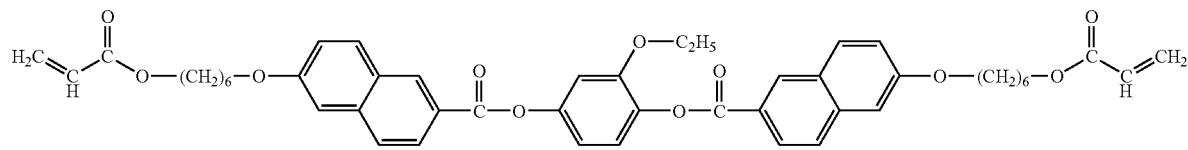
[Formula 15]
Compound No. 13
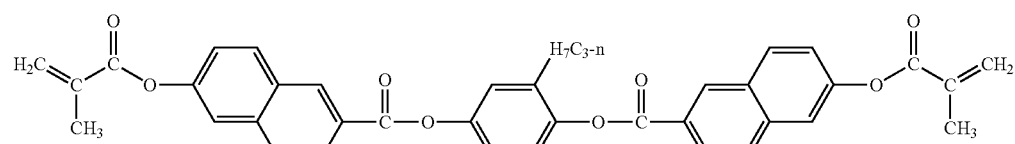
[Formula 16]
Compound No. 14
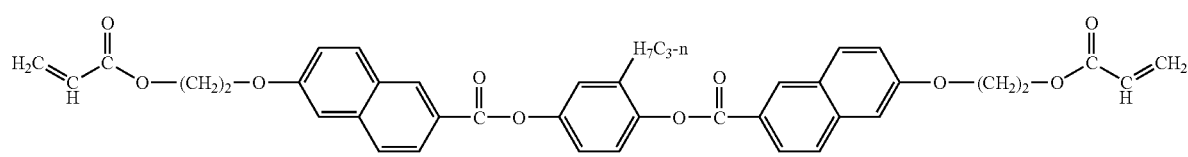

-continued
[Formula 17]
Compound No. 15
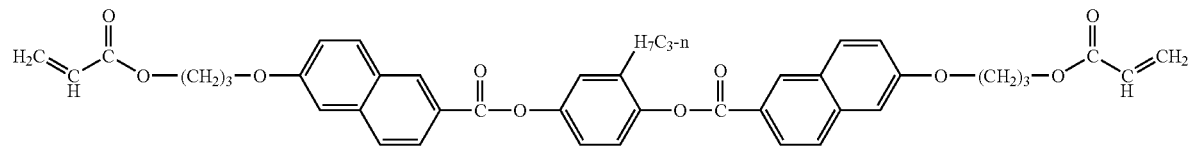
[Formula 18]
Compound No. 16
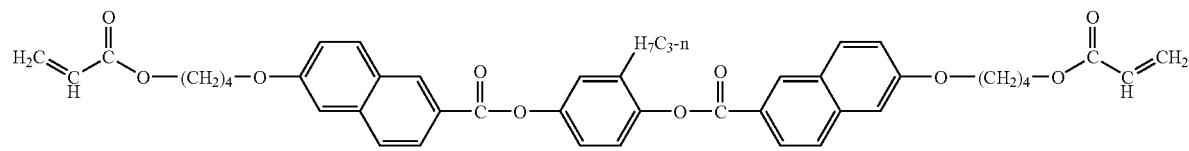
[Formula 19]
Compound No. 17
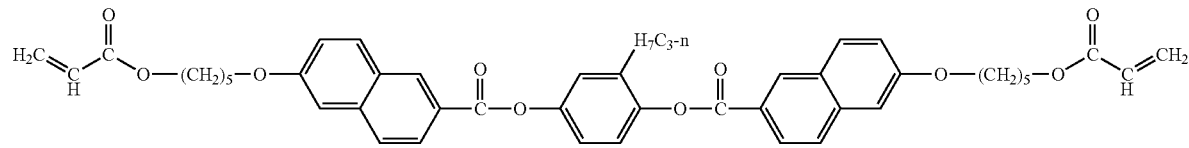
[Formula 20]
Compound No. 18
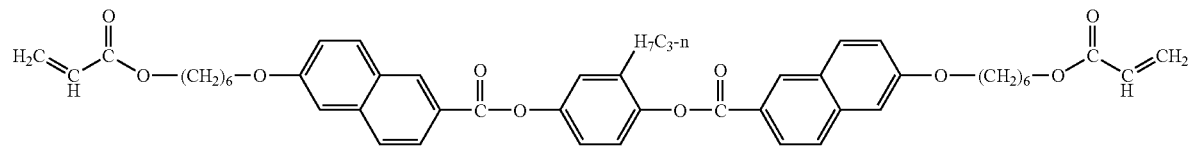
[Formula 21]
Compound No. 19
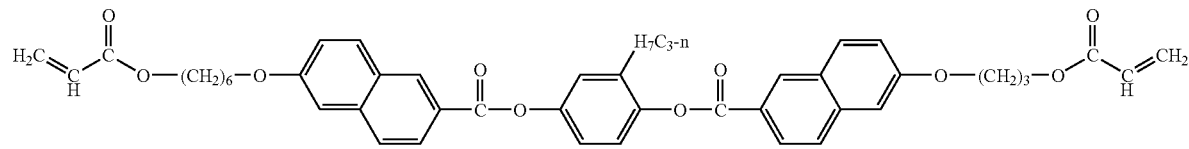
[Formula 22]
Compound No. 20
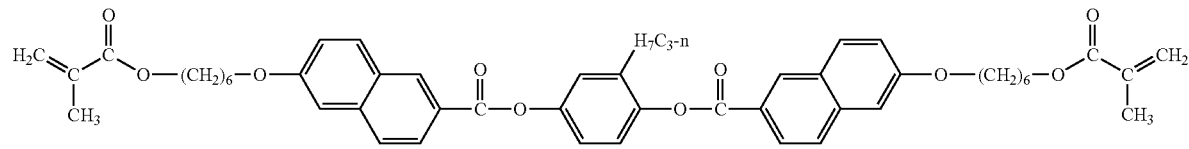
[Formula 23]
Compound No. 21
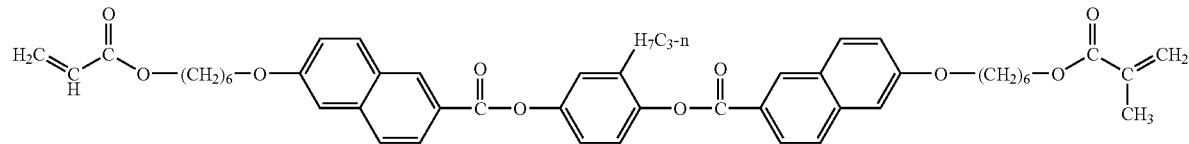

-continued
[Formula 24]
Compound No. 22
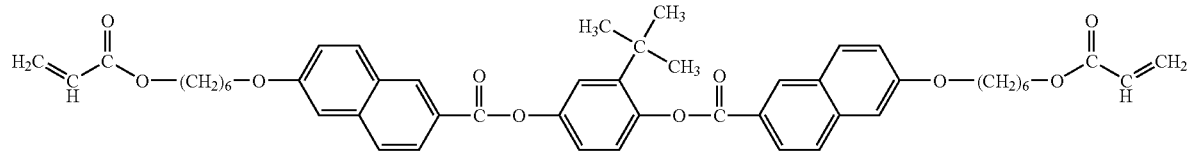
[Formula 25]
Compound No. 23
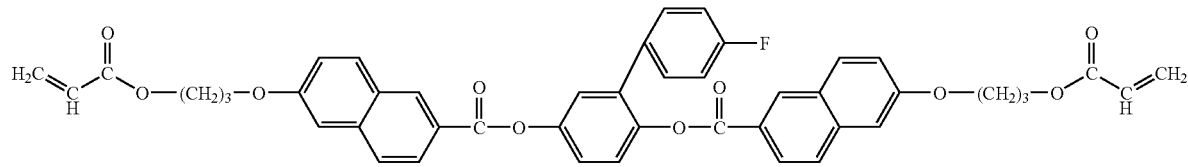
[Formula 26]
Compound No. 24
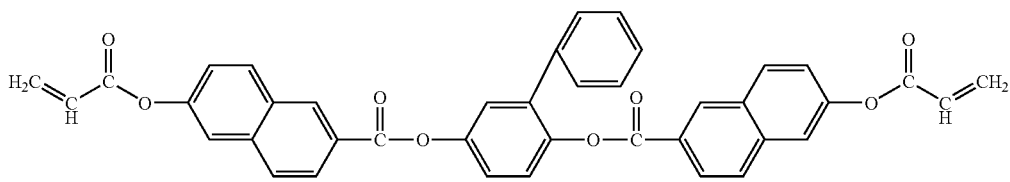
[Formula 27]
Compound No. 25
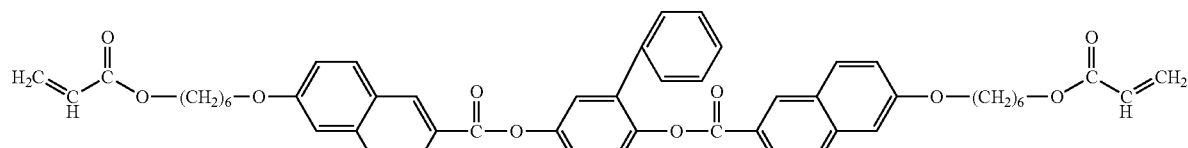
[Formula 28]
Compound No. 26
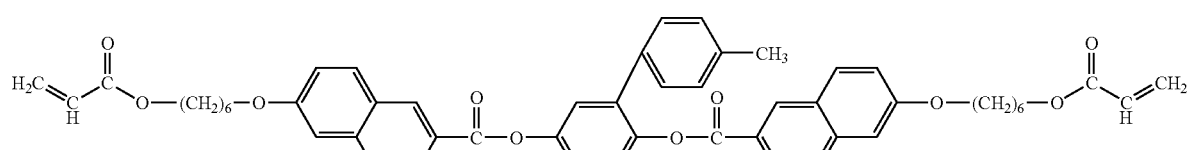
[Formula 29]
Compound No. 27
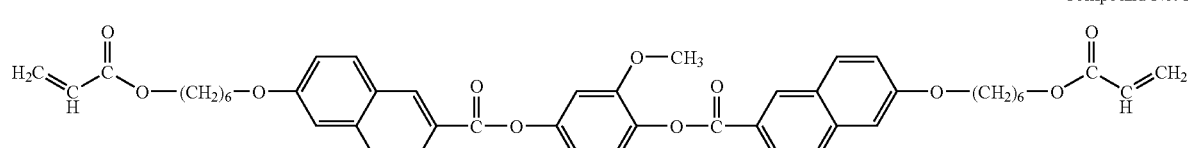
[Formula 30]
Compound No. 28
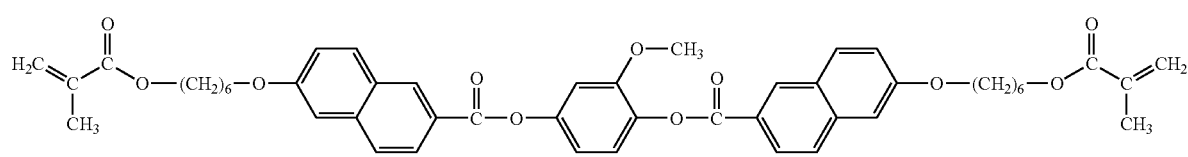

-continued
[Formula 31]
Compound No. 29
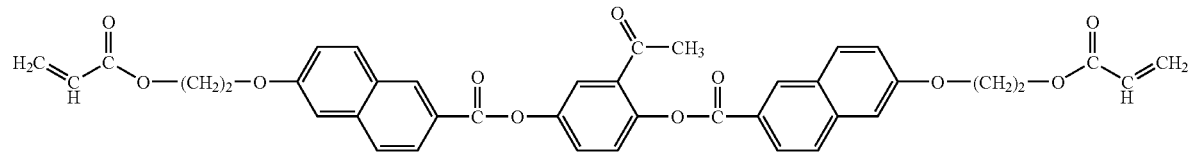
[Formula 32]
Compound No. 30
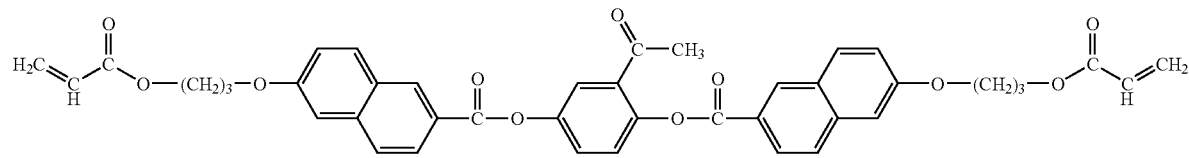
[Formula 33]
Compound No. 31
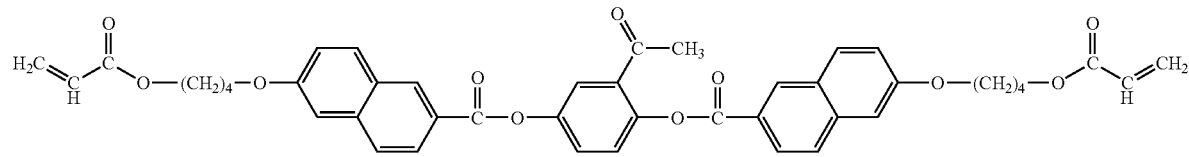
[Formula 34]
Compound No. 32
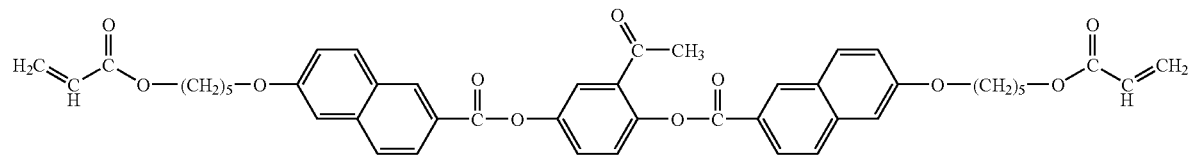
[Formula 35]
Compound No. 33
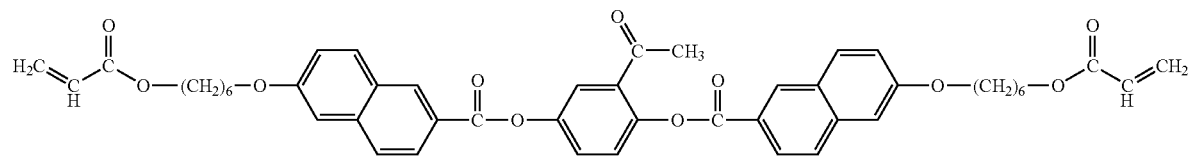
[Formula 36]
Compound No. 34
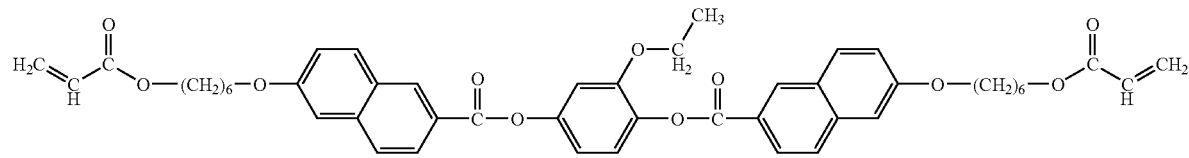
[Formula 37]
Compound No. 35
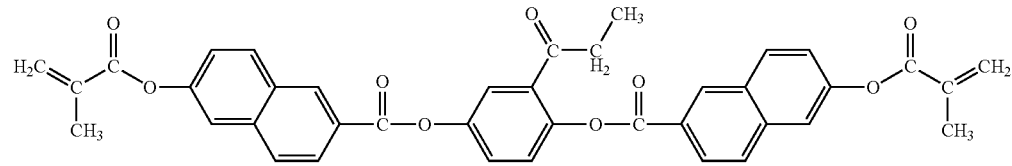

-continued
[Formula 38]
Compound No. 36
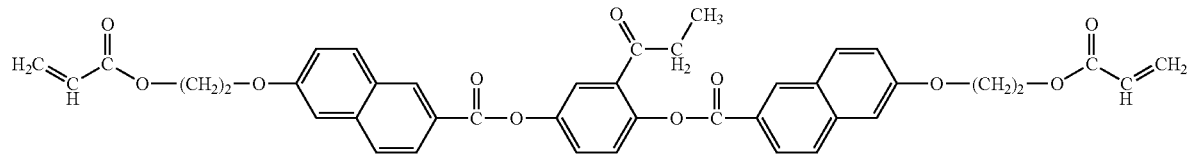
[Formula 39]
Compound No. 37
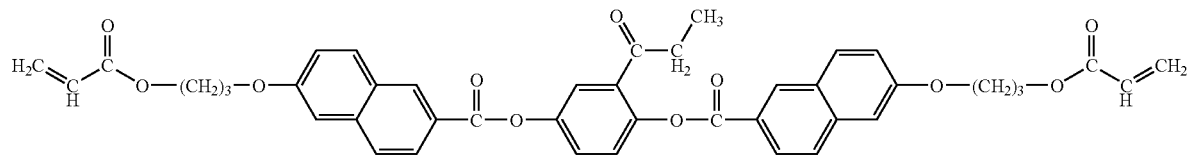
[Formula 40]
Compound No. 38
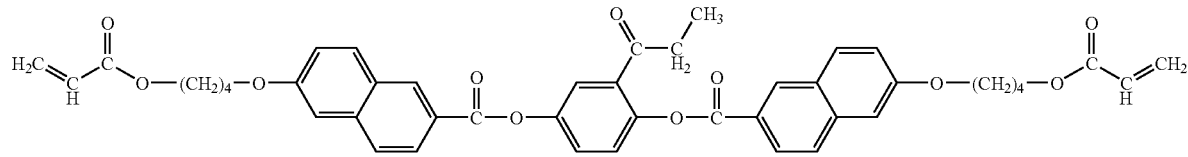
[Formula 41]
Compound No. 39
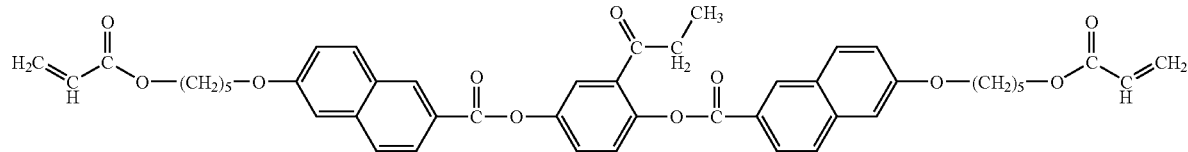
[Formula 42]
Compound No. 40
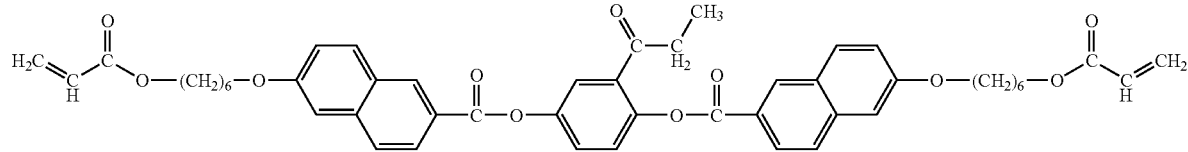
[Formula 43]
Compound No. 41
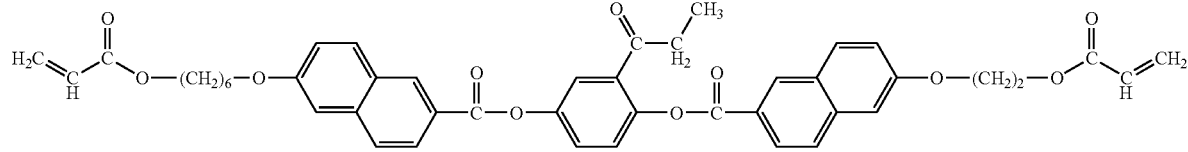
[Formula 44]
Compound No. 42
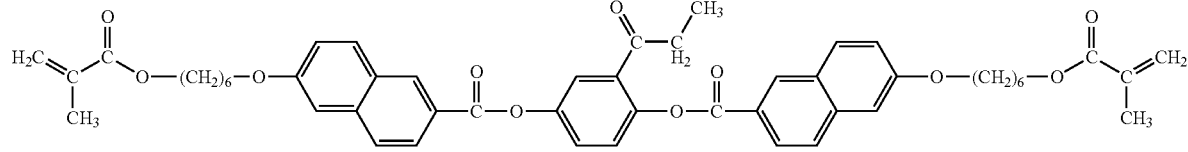

-continued
[Formula 45]
Compound No. 43
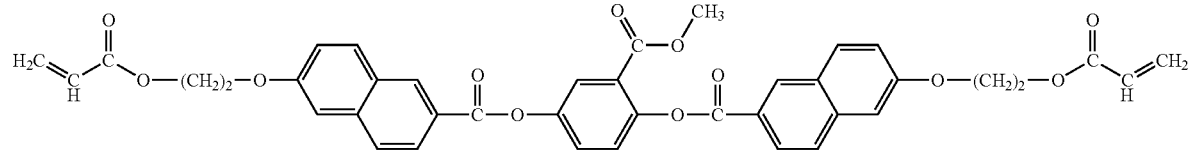
[Formula 46]
Compound No. 44
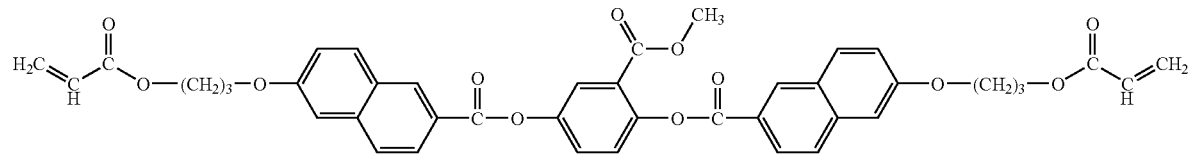
[Formula 47]
Compound No. 45
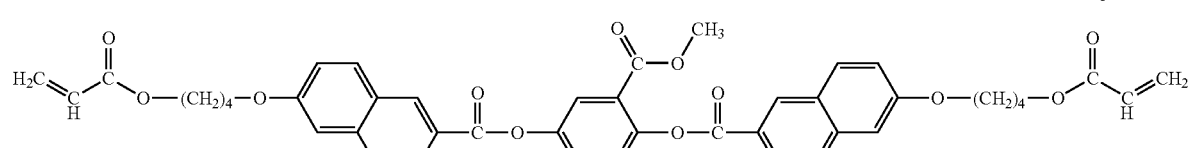
[Formula 48]
Compound No. 46
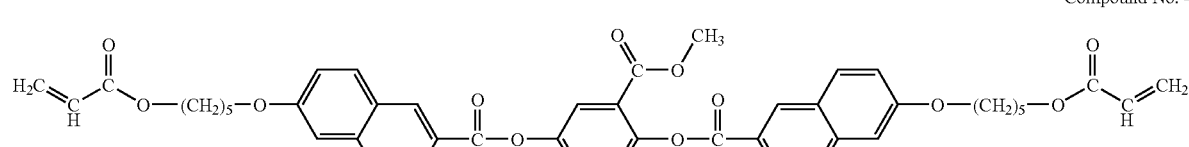
[Formula 49]
Compound No. 47
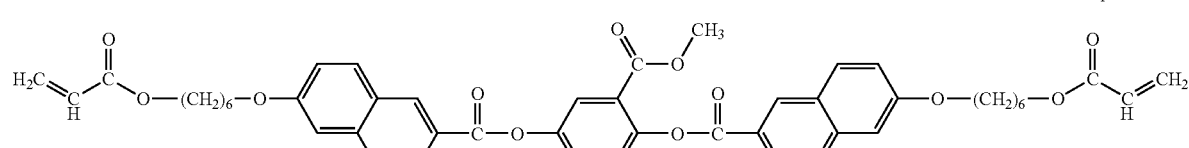
[Formula 50]
Compound No. 48
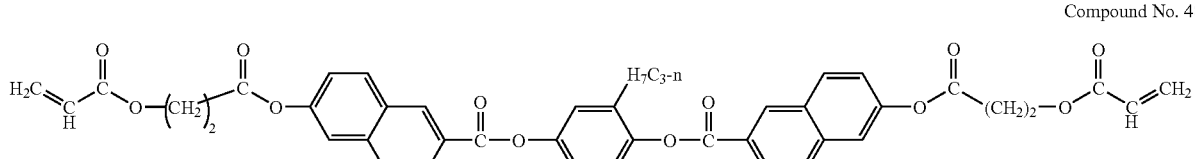
[Formula 51]
Compound No. 49
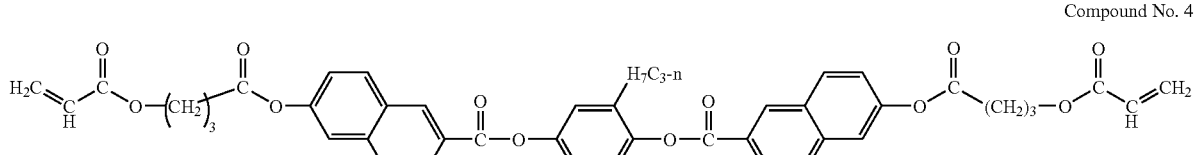

-continued
[Formula 52]
Compound No. 50
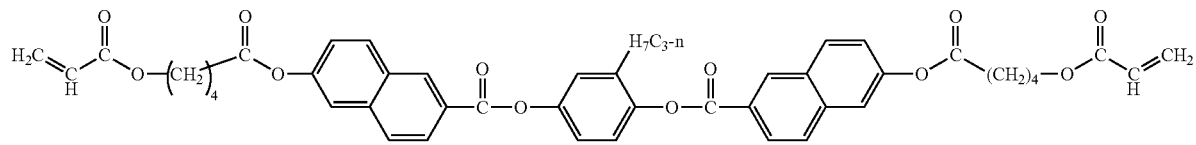
[Formula 53]
Compound No. 51
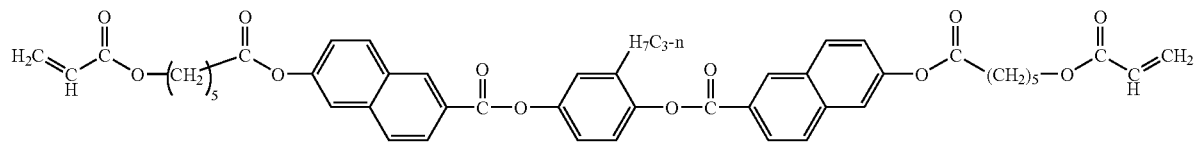
[Formula 54]
Compound No. 52
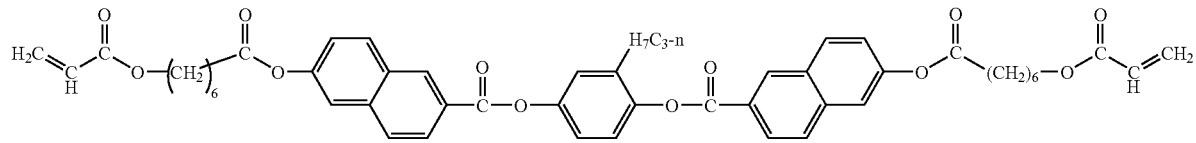
[Formula 55]
Compound No. 53
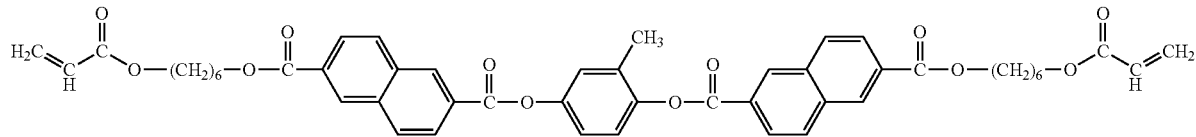
[Formula 56]
Compound No. 54
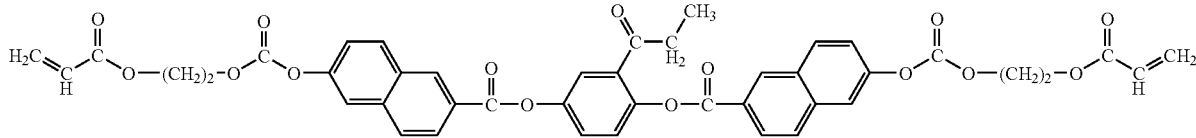
[Formula 57]
Compound No. 55
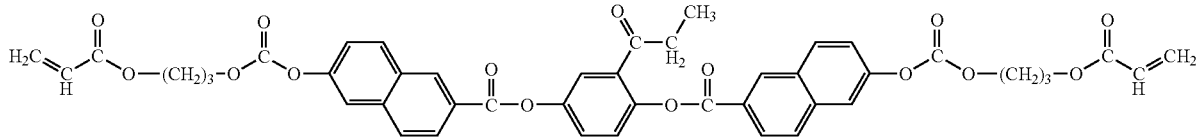
[Formula 58]
Compound No. 56
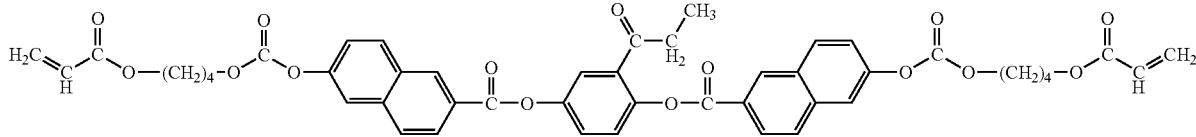

-continued
[Formula 59]
Compound No. 57
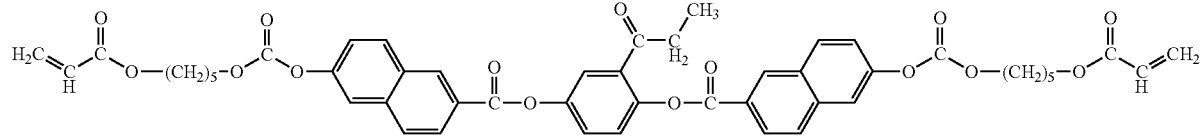
[Formula 60]
Compound No. 58
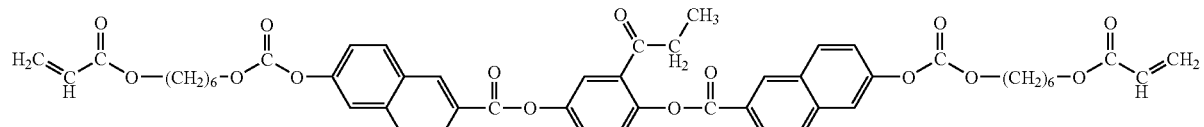
[Formula 61]
Compound No. 59
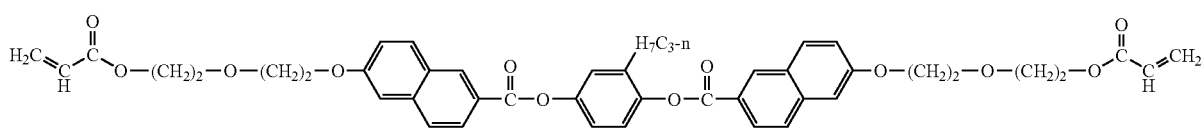
[Formula 62]
Compound No. 60
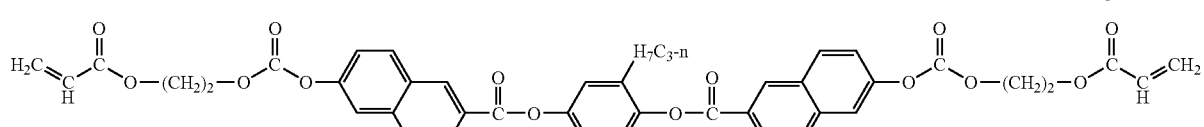
[Formula 63]
Compound No. 61
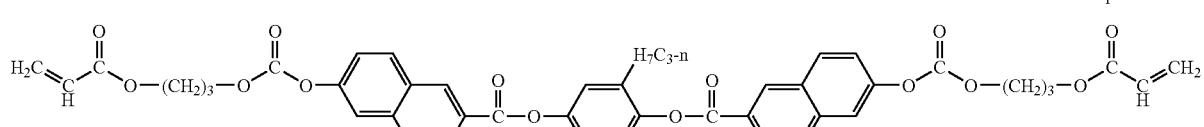
[Formula 64]
Compound No. 62
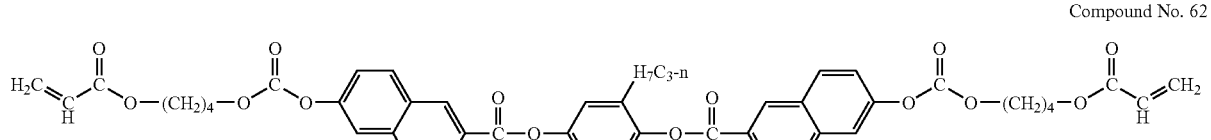
[Formula 65]
Compound No. 63
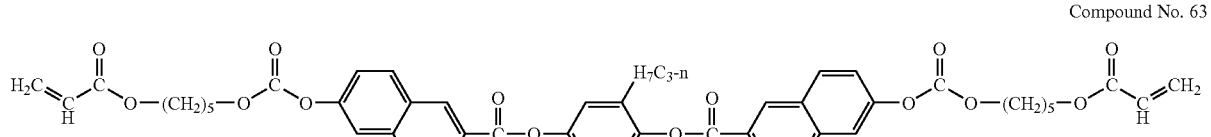
[Formula 66]
Compound No. 64
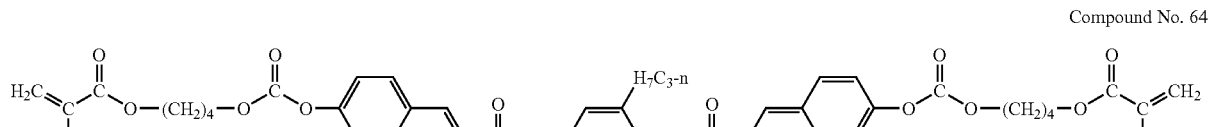

The polymerizable composition of the invention preferably contains the polymerizable compound of general formula (1) in a proportion of at least 50 parts, more preferably 70 parts or more, by mass per 100 parts by mass of the composition. When the proportion of the polymerizable compound of formula (1) is less than 50 parts, the polymerizable composition tends to have difficulty in alignment control and film thickness control.

The polymerizable compound of the invention is not restricted by the process of preparation and may be prepared using any known reactions. For example, the compound is prepared by esterifying a (meth)acryl halide with a phenol group, or mesylating a carboxyl group of a carboxylic acid compound having a (meth)acryloyl group with methanesulfonyl chloride, followed by esterification with a phenol compound.

The polymerizable compound of the invention is compounded with a liquid crystal material to provide a material suitable to form an optically anisotropic element excellent in heat resistance, solvent resistance, transparency, optical characteristics, and liquid crystal alignment fixing properties. The material is also useful as a liquid crystal alignment layer, a liquid crystal alignment controlling agent, a coating material, a protective film forming material, and so forth.

The polymerizable composition according to the invention will then be described.

The polymerizable composition of the invention is obtained by compounding the polymerizable compound of the invention and a known liquid crystal compound, a known liquid crystal-like compound, or a mixture thereof. Examples of useful liquid crystal compounds are described, e.g., in Japanese Patent Application No. 2005-210868, paras. [0031] to [0058] and [0063] to [0086] and JP 2005-15473A, paras. [0172] through [0314].

Of the liquid crystal compounds preferred are those having a polymerizable functional group. Examples of the polymerizable functional group include a (meth)acryloyloxy group, a fluoroacrylic group, a chloroacrylic group, a trifluoromethylacrylic group, an oxirane ring (epoxy group), an oxetane ring, a styrene compound (styryl group), a vinyl group, a vinyl ether group, a vinyl ketone group, a maleimide group, or a phenylmaleimide group.

The content of the liquid crystal compound in the composition is not limited as long as the effects of the polymerizable compound of the invention are not impaired.

It is preferred for the polymerizable composition to exhibit a liquid crystal phase at or near, at least, room temperature, specifically at or below 30° C., more preferably at or below 25° C.

Where necessary, the polymerizable composition of the invention may contain other monomer (a compound having an ethylenically unsaturated bond) and a radical polymerization initiator and be formulated into a solution in a solvent.

Examples of the other monomers include (meth)acrylic esters, such as methyl(meth)acrylate, ethyl(meth)acrylate, propyl(meth)acrylate, butyl(meth)acrylate, sec-butyl(meth)acrylate, tert-butyl(meth)acrylate, hexyl(meth)acrylate, 2-ethylhexyl(meth)acrylate, tetrahydrofurfuryl(meth)acrylate, glycidyl(meth)acrylate, allyl(meth)acrylate, allyloxy (meth)acrylate, cyclohexyl(meth)acrylate, benzyl(meth)acrylate, 1-phenylethyl(meth)acrylate, 2-phenylethyl(meth)acrylate, furfuryl(meth)acrylate, diphenylmethyl(meth)acrylate, naphthyl(meth)acrylate, pentachlorophenyl(meth)acrylate, 2-chloroethyl(meth)acrylate, methyl α-chloro(meth)acrylate, phenyl α-bromo(meth)acrylate, trifluoroethyl(meth)acrylate, tetrafluoropropyl(meth)acrylate, polyethylene glycol di(meth)acrylate, 1,4-butanediol di(meth)acrylate, 1,6-hexanediol di(meth)acrylate, trimethylolpropane tri(meth)acrylate, pentaerythritol tri(meth)acrylate, pentaerythritol tetra(meth)acrylate, dipentaerythritol penta(meth)acrylate, and dipentaerythritol hexa(meth)acrylate; diacetoneacrylamide, styrene, vinyltoluene, and divinylbenzene.

In order to secure heat resistance and optical characteristics of the polymer obtained from the polymerizable composition, the content of the other monomer is preferably not more than 50 parts by mass, more preferably 30 parts by mass or less, per 100 parts by mass of the polymerizable composition.

Examples of the radical polymerization initiator include benzoyl peroxide, 2,2'-azobisisobutyronitrile, benzoin ethers, benzophenones, acetophenones, benzyl ketals, diaryl iodonium salts, triaryl sulfonium salts, diphenyl iodonium tetrafluoroborate, diphenyl iodonium hexafluorophosphonate, diphenyl iodonium hexafluoroarsenate, diphenyl iodonium tetra(pentafluorophenyl)borate, 4-methoxyphenyl phenyl iodonium tetrafluoroborate, 4-methoxyphenyl phenyl iodonium hexafluorophosphonate, 4-methoxyphenyl phenyl iodonium hexafluoroarsenate, bis(4-tert-butylphenyl)iodonium diphenyl iodonium tetrafluoroborate, bis(4-tert-butylphenyl)iodonium diphenyl iodonium hexafluoroarsenate, bis(4-tert-butylphenyl)iodonium diphenyl iodonium trifluoromethanesulfonate, triphenyl sulfonium hexafluorophosphonate, triphenyl sulfonium hexafluoroarsenate, triphenyl sulfonium tetra(pentafluorophenyl)borate, 4-methoxyphenyl diphenyl sulfonium tetrafluoroborate, 4-methoxyphenyl diphenyl sulfonium hexafluorophosphonate, 4-methoxyphenyl diphenyl sulfonium hexafluoroarsenate, 4-methoxyphenyl diphenyl sulfonium trifluoromethanesulfonate, 4-methoxyphenyl diphenyl sulfonium triphenyl sulfonium tetra(pentafluorophenyl)borate, 4-phenylthiophenyl diphenyl sulfonium tetrafluoroborate, 4-phenylthiophenyl diphenyl sulfonium hexafluorophosphonate, 4-phenylthiophenyl diphenyl sulfonium hexafluoroarsenate, p-methoxyphenyl-2,4-bis(trichloromethyl)-s-triazine, 2-(p-butoxystyryl)-s-triazine, 2-(p-butoxystyryl)-5-trichloromethyl-1,3,4-oxadiazole, 9-phenylacridine, 9,10-dimethylbenzphenazine, benzophenone/Michler's ketone, hexaarylbiimidazole/mercaptobenzimidazole, benzyl dimethyl ketal, thioxanthone/amine, triarylsulfonium hexafluorophosphates, and bis(2,4,6-trimethylbenzoyl)phenylphosphine oxide.

A combination of the radical polymerization initiator and a sensitizer is also preferred. Examples of useful sensitizers are thioxanthone, phenothiazine, chlorothioxanthone, xanthone, anthracene, diphenylanthracene, and rubrene. The amount of the radical polymerization initiator or the combination of the radical polymerization initiator and the sensitizer, if added, is preferably 10 parts or less, more preferably 5 parts or less, even more preferably 0.1 to 3 parts, by mass per 100 parts by mass of the polymerizable composition.

Examples of the solvent include benzene, toluene, xylene, mesitylene, n-butylbenzene, diethylbenzene, tetralin, methoxybenzene, 1,2-dimethoxybenzene, ethylene glycol dimethyl ether, diethylene glycol dimethyl ether, acetone, methyl ethyl ketone, methyl isobutyl ketone, cyclopentanone, cyclohexanone, ethyl acetate, methyl lactate, ethyl lactate, ethylene glycol monomethyl ether acetate, propylene glycol monomethyl ether acetate, propylene glycol monoethyl ether acetate, γ-butyrolactone, 2-pyrrolidone, N-methyl-2-pyrrolidone, dimethylformamide, chloroform, dichloromethane, carbon tetrachloride, dichloroethane, trichloroethylene, tetrachloroethylene, chlorobenzene, t-butyl alcohol, diacetone alcohol, glycerol, monoacetylene, ethylene glycol, triethylene glycol, hexylene glycol, ethylene glycol monomethyl ether, ethyl cellosolve, and butyl cellosolve. The solvent may be a single compound or a mixture of compounds. A solvent having a boiling point of 60° to 250° C., particularly a solvent having a boiling point of 60° to 180° C. is preferred. A solvent whose boiling point is lower than 60° C. is liable to vaporize during application, resulting in thickness unevenness. A solvent whose boiling point is higher than 250° C. tends to remain even after solvent removal under reduced pressure or induce thermal polymerization when treated in high temperature, resulting in reduced aligning properties.

The polymerizable composition may further contain an optically active compound to provide a polymer having inside a helical structure of the liquid crystal skeleton, namely, a polymer having a cholesteric liquid crystal phase fixed therein. In this embodiment, the amount of the optically active compound to be added is preferably 0.1 to 100 parts, more preferably 1 to 50 parts, by mass per 100 parts by mass of the polymerizable composition except the solvent. Examples of usable optically active compounds are shown below.

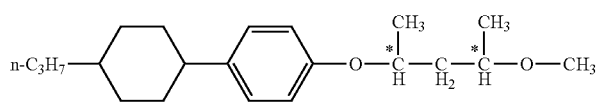

[Formula 67]

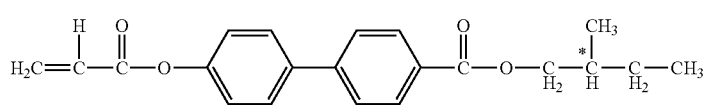

[Formula 68]

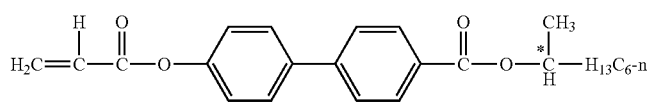

[Formula 69]

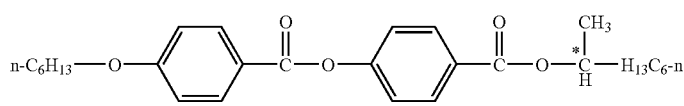

[Formula 70]

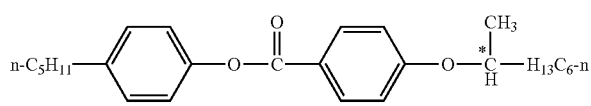

[Formula 71]

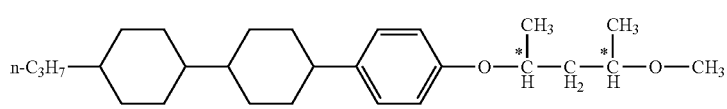

[Formula 72]

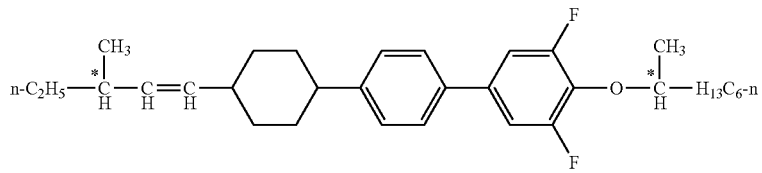

[Formula 73]

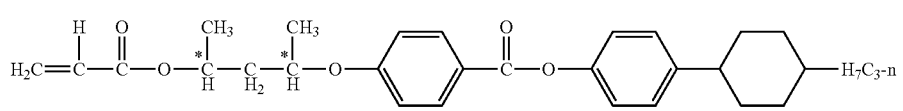

[Formula 74]

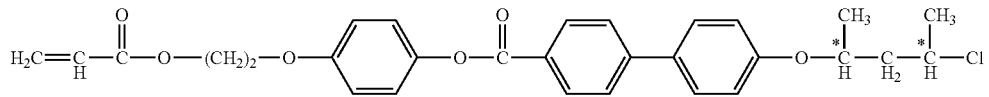

[Formula 75]

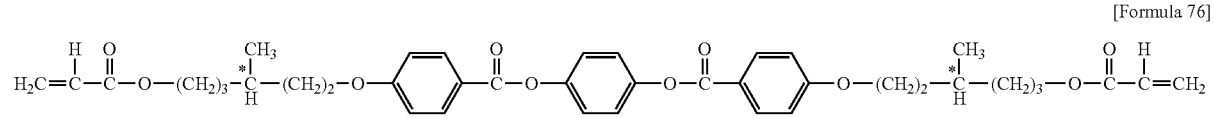

[Formula 76]

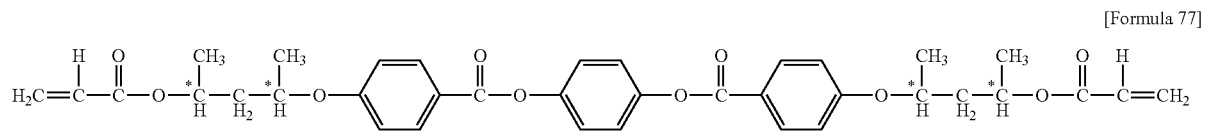

[Formula 77]

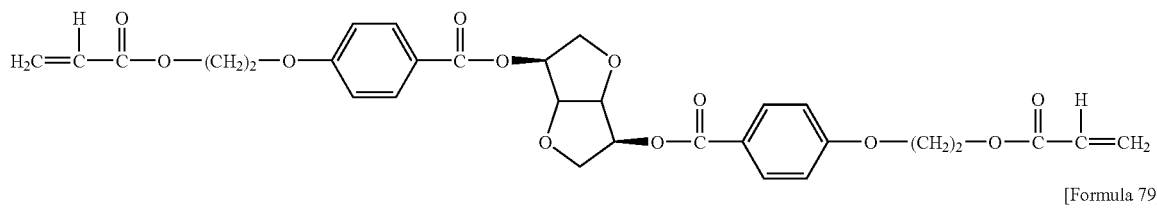

[Formula 78]

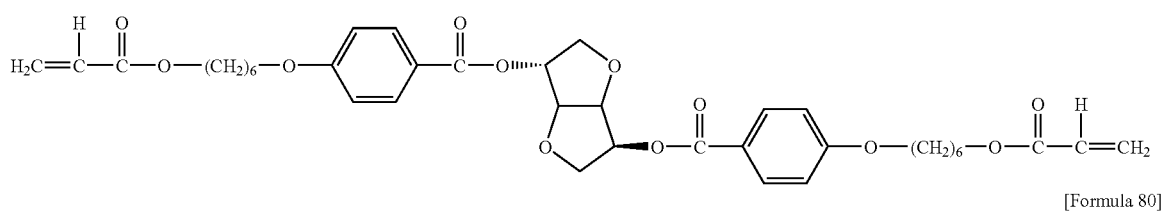

[Formula 79]

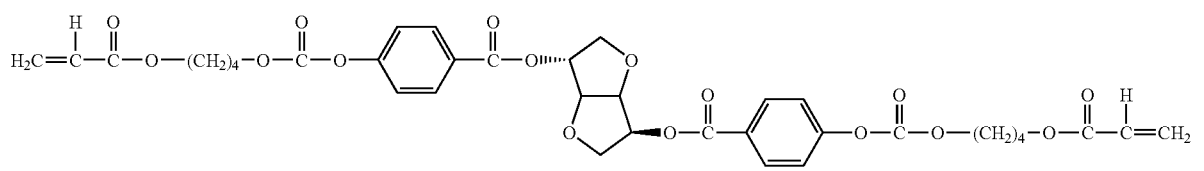

[Formula 80]

[Formula 81]

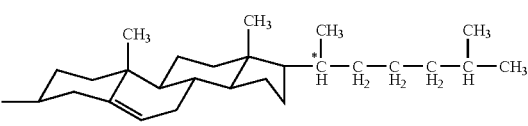

[Formula 82]

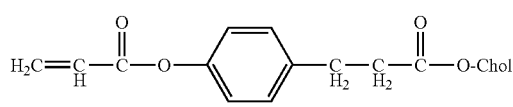

[Formula 83]

Chol is cholesteryl group shown below

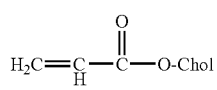

[Formula 84]

H₂C=CH-C(=O)-O-C₆H₄-CH₂-CH₂-C(=O)-O-Chol

Chol is identical with that in [formula 83] shown above

[Formula 85]

H₂C=CH-C(=O)-O-Chol

Chol is identical with that in [formula 83] shown above

The polymerizable composition preferably further contains a surfactant that produces an excluded volume effect over the interface with air. The surfactant is preferably selected from those effective in facilitating applying the polymerizable composition to a substrate or controlling the alignment of the liquid crystal phase. Such surfactants include quaternary ammonium salts, alkylamine oxides, polyamine derivatives, polyoxyethylene-polyoxypropylene condensates, polyethylene glycol and esters thereof, sodium laurylsulfate, ammonium laurylsulfate, amine laurylsulfates, alkyl-substituted aromatic sulfonates, alkylphosphates, perfluoroalkylsulfonates, perfluoroalkylcarboxylates, perfluoroalkyl ethylene oxide adducts, and perfluoroalkyltrimethylammonium salts. A preferred amount of the surfactant to be used depends on the kind of the surfactant, the compounding ratio of the composition, and the like but generally ranges from 0.01 to 5 parts, more preferably 0.05 to 1 part, by mass per 100 parts by mass of the polymerizable composition.

Additives may be added to the polymerizable composition where needed to improve characteristics of the composition, including functional compounds, such as storage stabilizers, antioxidants, ultraviolet absorbers, infrared absorbers, fine particles of organic, inorganic or other materials, and polymers.

The storage stabilizers serve to improve storage stability of the composition, including hydroquinone, hydroquinone monoalkyl ethers, tert-butyl catechols, pyrogallols, thiophenols, nitro compounds, 2-naphtylamines, and 2-hydroxynaphthalenes. The amount of the storage stabilizer, if used, is preferably 1 part or less, more preferably 0.5 parts or less, by mass per 100 parts by mass of the polymerizable composition.

Any known antioxidants may be used, including hydroquinone, 2,6-di(tert-butyl)-p-cresol, 2,6-di(tert-butyl)phenol, triphenyl phosphite, and trialkyl phosphites.

Any known UV absorbers may be used, including salicylic ester compounds, benzophenol compounds, benzotriazole compounds, cyanoacrylate compounds, and nickel complex salt compounds.

The fine particles may be used to adjust the optical (refractive index, Δn) anisotropy or enhance the strength of the polymer. The fine particles may be of organic, inorganic or metallic materials. The particle size is preferably 0.001 to 0.1 μm, more preferably 0.001 to 0.05 μm, to prevent flocculation. The particle size distribution is preferably narrow. The amount of the particles, if used, is preferably 0.1 to 30 parts by mass per 100 parts by mass of the polymerizable composition.

The inorganic materials include ceramics, fluorophlogopite, fluorotetrasilicic mica, taeiniolite, fluorovermiculite, fluorohectorite, hectorite, saponite, stevensite, montmorillonite, beidellite, kaolinite, fraipontite, ZnO, $TiO_2$, $CeO_2$, $Al_2O_3$, $Fe_2O_3$, $ZrO_2$, $MgF_2$, $SiO_2$, $SrCO_3$, $Ba(OH)_2$, $Ca(OH)_2$, $Ga(OH)_3$, $Al(OH)_3$, $Mg(OH)_2$ and $Zr(OH)_4$. Fine particles having optical anisotropy exemplified by needle-like crystals of calcium carbonate may be used to adjust the optical anisotropy of the polymer.

The organic materials include carbon nanotube, fullerene, dendrimer, polyvinyl alcohol, polymethacrylate, and polyimide.

The polymer as an additive is preferably selected from those serving for adjusting the electric characteristics or alignment characteristics of the polymer of the invention and soluble in the above recited solvent. Examples of such a polymer include polyamide, polyurethane, polyurea, polyepoxide, polyester, and polyester polyol.

The polymer of the present invention will now be described.

The polymer of the invention is obtained by dissolving the polymerizable composition of the invention in a solvent, applying the resulting solution of the polymerizable composition to a substrate, removing the solvent from the coating film in which the liquid crystal molecules of the polymerizable composition have been aligned, and then irradiating the coating film with energy rays to cause polymerization.

Examples of preferred substrates include, but are not limited to, plates of glass, polyethylene terephthalate, polycarbonate, polyimide, polyamide, polymethyl methacrylate, polystyrene, polyvinyl chloride, polytetrafluoroethylene, cellulose, silicone, cycloolefin polymers, or calcite, and a reflector plate. It is preferred to use the above described substrate which has formed thereon a polyimide alignment layer or a polyvinyl alcohol alignment layer.

The polymerizable composition solution can be applied to the substrate by any known coating techniques including curtain coating, extrusion coating, roll coating, spin coating, dipping, bar coating, spraying, slide coating, printing, and casting. The thickness of the polymer film is decided as appropriate to the end use, and is preferably 0.05 to 10 μm.

The liquid crystal molecules in the polymerizable composition are aligned by, for example, previously subjecting the substrate to an alignment treatment. Such an alignment treatment of the substrate is preferably carried out by providing a liquid crystal alignment layer, such as a polyimide alignment layer or a polyvinyl alcohol alignment layer, on the substrate, followed by rubbing the alignment layer or a like operation. Molecular alignment may also be achieved by applying a magnetic field or an electric field to the coating film of the polymerizable composition on the substrate.

The polymerizable composition can be polymerized by known processes using heat or electromagnetic waves. Electromagnetic radiation-induced polymerization reactions include radical polymerization, anionic polymerization, cationic polymerization, coordination polymerization, and living polymerization. It is easy with electromagnetic radiation to effect polymerization under a condition in which the polymerizable composition exhibits a liquid crystal phase. Crosslinking reaction in a magnetic field or an electric field is also preferred. The liquid crystal (co)polymer formed on the substrate may be used as such or, when needed, stripped off the substrate or transferred onto a different substrate.

Examples of the electromagnetic radiation include ultraviolet light, visible light, and infrared light. Other types of electromagnetic radiation, such as electron beams and X rays, may also be used. Usually, ultraviolet light or visible light is preferred. A preferred wavelength range is from 150 to 500 nm, more preferably from 250 to 450 nm, even more preferably 300 to 400 nm. Light sources include low pressure mercury lamps (e.g., bactericidal lamps, fluorescent chemical lamps, and black lights), high pressure discharge lamps (e.g., high pressure mercury lamps and metal halide lamps), and short arc discharge lamps (ultrahigh pressure mercury lamps, xenon lamps, and mercury xenon lamps), with ultrahigh pressure mercury lamps being preferred. The polymerizable composition may be irradiated with the light as emitted from a light source or a light ray of a specific wavelength or light rays of a specific wavelength range selected through a filter. A preferred irradiation energy density is 2 to 5000 $mJ/cm^2$, more preferably 10 to 3000 $mJ/cm^2$, even more preferably 100 to 2000 $mJ/cm^2$. A preferred illuminance is 0.1 to 5000 $mW/cm^2$, more preferably 1 to 2000 $mW/cm^2$. The temperature during irradiation may be decided so that the polymerizable composition may have a liquid crystal phase and is preferably 100° C. or lower. At 100° C. or higher temperatures, thermal polymerization can occur, resulting in a failure to obtain satisfactory alignment.

The polymer of the invention is useful as a molded article with optical anisotropy. Such a molded article finds applications for optical compensation, such as a retardation film (e.g., a ½-wave plate or a ¼-wave plate), a polarizer, a dichroic polarizing plate, a liquid crystal alignment layer, an alignment controlling film, an antireflective film, a selectively reflecting film, and a viewing angle compensation film. The molded article also finds use as an optical lens, such as a liquid crystal lens or a microlens, and an information recording material, such as a polymer dispersed liquid crystal (PDLC) type e-paper or a digital paper.

The present invention will now be illustrated in greater detail by way of Synthetic Examples, Preparation Example, and Examples, but it should be understood that the invention is not deemed to be limited thereto. Synthesis Examples 1 through 10 illustrate preparation of the polymerizable compounds according to the invention. Preparation Example 1 shows preparation of the polymerizable compositions according to the invention and preparation of polymers using the polymerizable compositions. Examples 1 and 2 illustrate evaluation of the polymers according to the invention.

Synthesis Example 1

Preparation of Compound No. 5

Compound No. 5 was synthesized as follows in accordance with reaction scheme:

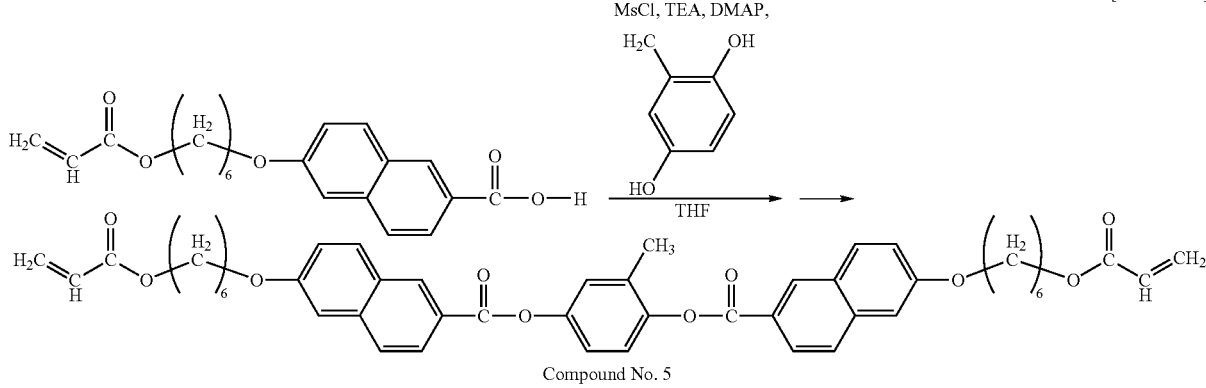

Compound No. 5

MsCl: methanesulfonyl chloride TEA: triethylamine DMAP: 4-dimethylaminopyridine THF: tetrahydrofuran In a nitrogen atmosphere, 13.70 g (40.00 mmol) of 6-(6-acryloyloxyhexyloxy)naphthalene-2-carboxylic acid was dissolved in 60 g of tetrahydrofuran (THF). After the solution was cooled to −30° C., 5.50 g (48.01 mmol) of methanesulfonyl chloride (MsCl) was added to the solution, and 10.51 g of triethylamine (TEA) was added thereto dropwise, followed by stirring for 1 hour. To the mixture were added 0.02 g (0.15 mmol) of 4-dimethylaminopyridine (DMAP) and 2.48 g (19.98 mmol) of methylhydroquinone, followed by stirring at or below 0° C. for 1 hour. After the stirring, the reaction mixture was poured into 500 ml of water and filtered to collect the precipitate thus formed. The precipitate was washed by stirring in a methanol solution and collected by filtration to give 12.2 g (79%) of white crystals, which were identified to be compound No. 5 as a result of analyses. The results of the analyses are shown below.

(1) $^1$H-NMR (400 MHz, CDCl$_3$) (ppm)

1.4-2.0 (m, 16H), 2.3 (s, 3H), 4.2 (q, 8H), 5.7-6.5 (m, 6H), 7.1-7.3 (m, 7H), 7.8 (t, 4H), 8.1 (d, 214), 8.7 (s, 2H)

(2) IR (KBr tablet method) (cm$^{-1}$)

478, 567, 675, 745, 806, 872, 899, 937, 1015, 1061, 1173, 1200, 1277, 1339, 1393, 1416, 1470, 1628, 1724, 2862, 2939, 3062

(3) Phase transition temperature

The compound was analyzed on a differential scanning calorimeter Thermo Plus DSC-8230 from Rigaku Corp. under conditions of a nitrogen atmosphere (50 ml/min), a heating rate of 5° C./min, and a measuring temperature of from room temperature (20° to 30° C.) up to 150° C. As a result, the following phase transition temperature was confirmed.

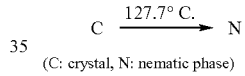

(C: crystal, N: nematic phase)

Synthesis Example 2

Preparation of Compound No. 14

Compound No. 14 was synthesized as follows in accordance with reaction scheme:

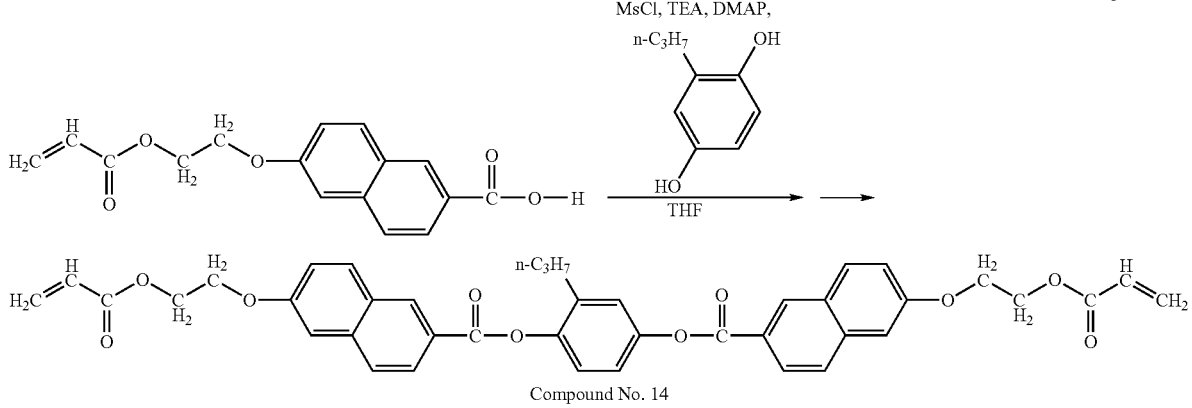

Compound No. 14

MsCl: methanesulfonyl chloride TEA: triethylamine DMAP: 4-dimethylaminopyridine THF: tetrahydrofuran In a nitrogen atmosphere, 10 g (34.93 mmol) of 6-(2-acryloyloxyethoxy)naphthalene-2-carboxylic acid was dissolved in 45 g of tetrahydrofuran (THF). After the solution was cooled to −30° C., 4.4 g (38.41 mmol) of methanesulfonyl chloride (MsCl) was added to the solution, and 9.54 g of triethylamine (TEA) was added thereto dropwise, followed by stirring for 1 hour. To the mixture were added 0.04 g (0.29 mmol) of 4-dimethylaminopyridine (DMAP) and 2.39 g

Synthesis Example 3

Preparation of Compound No. 18

Compound No. 18 was synthesized as follows in accordance with reaction scheme:

[Formula 90]

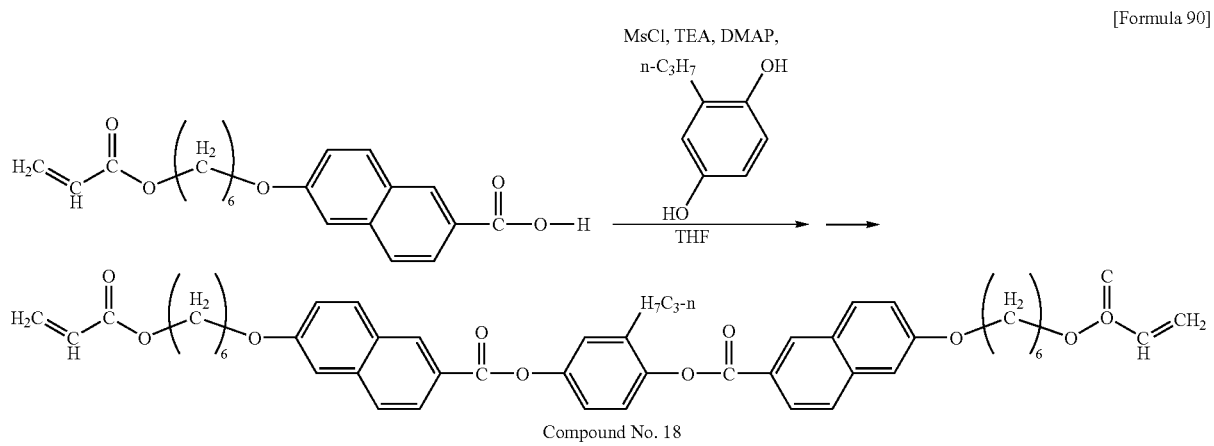

Compound No. 18

MsCl: methanesulfonyl chloride TEA: triethylamine DMAP: 4-dimethylaminopyridine THF: tetrahydrofuran (15.70 mmol) of propyhydroquinone, followed by stirring for 1 hour while maintaining the temperature at or below 0° C. After the stirring, 40 g of ethyl acetate and 20 g of water were added to the reaction mixture to conduct oil-water separation. The organic layer was extracted and washed with water. The washed organic layer was dried over magnesium sulfate and filtered. The filtrate was concentrated under reduced pressure, and the residue was purified by column chromatography on silica gel (developing solvent: toluene) to give 6.0 g (56%) of white crystals, which were identified to be compound No. 14 as a result of analyses. The results of the analyses are shown below.

(1) $^1$H-NMR (400 MHz, CDCl$_3$) (ppm)

0.95 (t, 3H), 1.69 (q, 2H), 2.64 (t, 2H) 4.30-4.51 (m, 4H), 4.51-4.73 (m, 4H), 5.78-6.62 (m, 6H), 7.10-7.40 (m, 7H), 7.82 (d, 2H), 7.93 (d, 2H), 8.19 (d, 2H), 8.72 (s, 2H)

(2) IR (KBr tablet method) (cm$^{-1}$)

471, 590, 745, 810, 953, 1069, 1169, 1192, 1273, 1411, 1477, 1628, 1724, 2870, 3425

(3) Phase transition temperature

The compound was analyzed on a differential scanning calorimeter Thermo Plus DSC-8230 from Rigaku Corp. under conditions of a nitrogen atmosphere (50 ml/min), a heating rate of 5° C./min, and a measuring temperature of from room temperature (20° to 30° C.) up to 150° C. As a result, the following phase transition temperature was confirmed.

[Formula 89]

$$C \xrightarrow{120.0^\circ C.} N$$

(C: crystal, N: nematic phase)

In a nitrogen atmosphere, 13.70 g (40.00 mmol) of 6-(6-acryloyloxyhexyloxy)naphthalene-2-carboxylic acid was dissolved in 60 g of tetrahydrofuran (THF). After the solution was cooled to −30° C., 5.50 g (48.01 mmol) of methanesulfonyl chloride (MsCl) was added to the solution, and 10.51 g of triethylamine (TEA) was added thereto dropwise, followed by stirring for 1 hour. To the mixture were added 0.02 g (0.15 mmol) of 4-dimethylaminopyridine (DMAP) and 3.04 g (19.98 mmol) of propylhydroquinone, followed by stirring for 1 hour while maintaining the temperature at or below 0° C. After the stirring, 40 g of ethyl acetate and 20 g of water were added to the reaction mixture to conduct oil-water separation. The organic layer was extracted and washed with water. The organic layer was dried over magnesium sulfate and filtered. The filtrate was concentrated under reduced pressure, and the residue was purified by column chromatography on silica gel (developing solvent: toluene) and crystallized from a methanol/toluene mixed solvent to give 11.0 g (69%) of white crystals, which were identified to be compound No. 18 as a result of analyses. The results of the analyses are shown below.

(1) $^1$H-NMR (400 MHz, CDCl$_3$) (ppm)

0.9 (t, 3H), 1.3-2.1 (m, 181-1), 2.6 (t, 2H), 4.2 (q, 8H), 5.7-6.5 (m, 6H), 7.0-7.3 (m, 7H), 7.8 (t, 4H), 8.2 (d, 2H), 8.7 (s, 2H)

(2) IR (KBr tablet method) (cm$^{-1}$)

471, 502, 586, 745, 806, 941, 961, 991, 1065, 1169, 1196, 1273, 1339, 1393, 1470, 1624, 1724, 2862, 2939, 3062

(3) Phase transition temperature

The compound was analyzed on a differential scanning calorimeter Thermo Plus DSC-8230 from Rigaku Corp. under conditions of a nitrogen atmosphere (50 ml/min), a heating rate of 5° C./min, and a measuring temperature of from room temperature (20° to 30° C.) up to 150° C. As a result, the following phase transition temperature was confirmed.

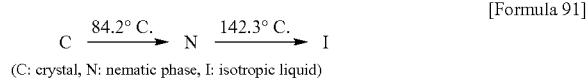

(C: crystal, N: nematic phase, I: isotropic liquid)

[Formula 91]

Synthesis Example 4

Preparation of Compound No. 22

Compound No. 22 was synthesized as follows in accordance with reaction scheme:

mixed solvent to give 7.7 g (47%) of white crystals, which were identified to be compound No. 22 as a result of analyses. The results of the analyses are shown below.

(1) $^1$H-NMR (400 MHz, CDCl$_3$) (ppm)

1.3-2.0 (m, 25H), 4.2 (q, 8H), 5.7-6.5 (m, 6H), 7.2-7.4 (m, 7H), 7.9 (t, 4H), 8.2 (d, 2H), 8.7 (s, 2H)

(2) IR (KBr tablet method) (cm$^{-1}$)

478, 748, 810, 856, 895, 934, 964, 988, 1011, 1061, 1165, 1170, 1273, 1389, 1470, 1624, 1728, 2858, 2947

(3) Phase transition temperature

The compound was analyzed on a differential scanning calorimeter Thermo Plus DSC-8230 from Rigaku Corp. under conditions of a nitrogen atmosphere (50 ml/min), a heating rate of 5° C./min, and a measuring temperature of

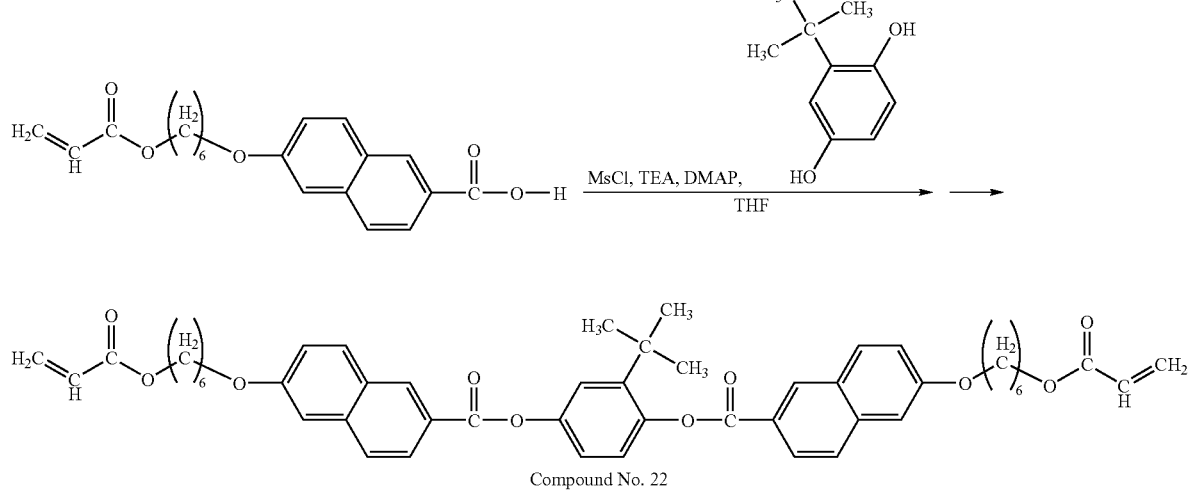

[Formula 92]

Compound No. 22

MsCl: methanesulfonyl chloride TEA: triethylamine DMAP: 4- dimethylaminopyridine
THF: tetrahydrofuran In a nitrogen atmosphere, 13.70 g (40.00 mmol) of 6-(6-acryloyloxyhexyloxy)naphthalene-2-carboxylic acid was dissolved in 60 g of tetrahydrofuran (THF). After the solution was cooled to −30° C., 5.50 g (48.01 mmol) of methanesulfonyl chloride (MsCl) was added to the solution, and 10.51 g of triethylamine (TEA) was added thereto dropwise, followed by stirring for 1 hour. To the mixture were added 0.02 g (0.15 mmol) of 4-dimethylaminopyridine (DMAP) and 3.32 g (19.97 mmol) of t-butylhydroquinone, followed by stirring at or below 50° C. for 2 hours. After the stirring, 60 g of ethyl acetate and 20 g of water were added to the reaction mixture to conduct oil-water separation. The organic layer was extracted and washed with water. The organic layer was dried over magnesium sulfate and filtered. The filtrate was concentrated under reduced pressure, and the residue was purified by column chromatography on silica gel (developing solvent: toluene), followed by crystallization from a methanol/toluene from room temperature (20° to 30° C.) up to 150° C. As a result, the following phase transition temperature was confirmed.

(C: crystal, N: nematic phase)

[Formula 93]

Synthesis Example 5

Preparation of Compound No. 24

Compound No. 24 was synthesized as follows in accordance with reaction scheme:

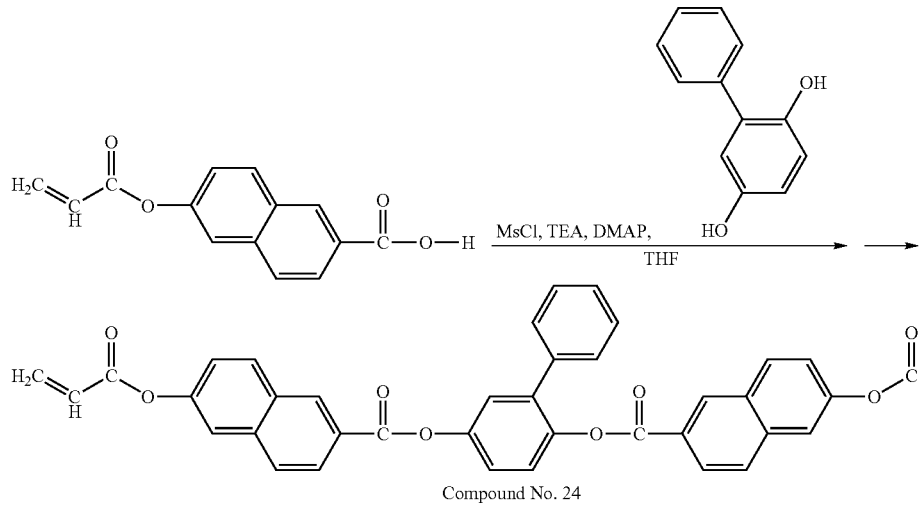

Compound No. 24

MsCl: methanesulfonyl chloride TEA: triethylamine DMAP: 4-dimethylaminopyridine
THF: tetrahydrofuran In a nitrogen atmosphere, 14.53 g (59.98 mmol) of 6-acryloyloxynaphthalene-2-carboxylic acid was dissolved in 80 g of tetrahydrofuran (THF). After the solution was cooled to −30° C., 8.25 g (72.02 mmol) of methanesulfonyl chloride (MsCl) was added to the solution, and 15.77 g of triethylamine (TEA) was added thereto dropwise, followed by stirring for 1 hour. To the mixture were added 0.04 g (0.29 mmol) of 4-dimethylaminopyridine (DMAP) and 5.59 g (30.02 mmol) of 2-phenylhydroquinone, followed by stirring for 1 hour while maintaining the temperature at or below 0° C. After the stirring, 40 g of ethyl acetate and 40 g of water were added to the reaction mixture to conduct oil-water separation. The organic layer was extracted and washed with water. The organic layer was dried over magnesium sulfate and filtered. The filtrate was concentrated under reduced pressure, and the residue was washed with toluene to give 9.8 g (52%) of white crystals, which were identified to be compound No. 24 as a result of analyses. The results of the analyses are shown below.

(1) $^1$H-NMR (400 MHz, CDCl$_3$) (ppm)
6.0-6.8 (m, 6H), 7.2-8.3 (m, 24H), 8.6 (s, 1H), 8.8 (s, 1H)
(2) IR (KBr tablet method) (cm$^{-1}$)
478, 702, 741, 764, 806, 914, 934, 988, 1018, 1076, 1157, 1184, 1246, 1265, 1400, 1474, 1504, 1628, 1724, 2858
(3) Phase transition temperature
The compound was analyzed on a differential scanning calorimeter Thermo Plus DSC-8230 from Rigaku Corp. under conditions of a nitrogen atmosphere (50 ml/min), a heating rate of 5° C./min, and a measuring temperature of from room temperature (20° to 30° C.) up to 150° C. As a result, a melting point at 171.7° C. was confirmed.

Synthesis Example 6

Preparation of Compound No. 25

Compound No. 25 was synthesized as follows in accordance with reaction scheme:

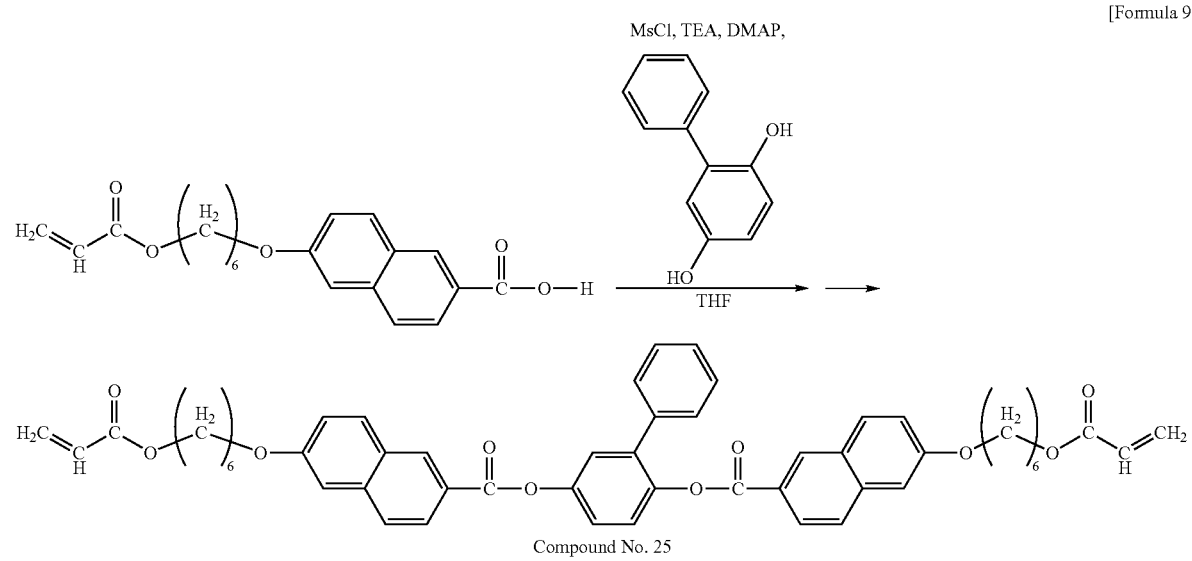

Compound No. 25

MsCl: methanesulfonyl chloride TEA: triethylamine DMAP: 4-dimethylaminopyridine THF: tetrahydrofuran In a nitrogen atmosphere, 13.70 g (40.00 mmol) of 6-(6-acryloyloxyhexyloxy)naphthalene-2-carboxylic acid was dissolved in 60 g of tetrahydrofuran (THF). After the solution was cooled to −30° C., 5.50 g (48.01 mmol) of methanesulfonyl chloride (MsCl) was added to the solution, and 10.51 g of triethylamine (TEA) was added thereto dropwise, followed by stirring for 1 hour. To the mixture were added 0.02 g (0.15 mmol) of 4-dimethylaminopyridine (DMAP) and 3.72 g (19.98 mmol) of phenylhydroquinone, followed by stirring for 1 hour while maintaining the temperature at or below 0° C. After the stirring, 60 g of ethyl acetate and 20 g of water were added to the reaction mixture to conduct oil-water separation. The organic layer was extracted and washed with water. The washed organic layer was dried over magnesium sulfate and filtered. The filtrate was concentrated under reduced pressure, and the residue was purified by column chromatography on silica gel (developing solvent: toluene), followed by crystallization from a methanol/toluene mixed solvent to give 13.3 g (80%) of white crystals, which were identified to be compound No. 25 as a result of analyses. The results of the analyses are shown below.

(1) $^1$H-NMR (400 MHz, CDCl$_3$) (ppm)

1.4-2.0 (m, 16H), 4.1 (q, 8H), 5.7-6.5 (m, 6H), 7.1-8.2 (m, 18H), 8.5 (s, 1H), 8.7 (s, 1H)

(2) IR (KBr tablet method) (cm$^{-1}$)

478, 583, 698, 745, 810, 856, 876, 899, 941, 988, 1022, 1061, 1119, 1165, 1200, 1273, 1342, 1389, 1408, 1474, 1624, 1720, 2858, 2939, 3067

(3) Phase transition temperature

The compound was analyzed on a differential scanning calorimeter Thermo Plus DSC-8230 from Rigaku Corp. under conditions of a nitrogen atmosphere (50 ml/min), a heating rate of 5° C./min, and a measuring temperature of from room temperature (20° to 30° C.) up to 150° C. As a result, the following phase transition temperature was confirmed.

[Formula 96]

$$C \xrightarrow{113.6°\ C.} N$$

(C: crystal, N: nematic phase)

Synthesis Example 7

Preparation of Compound No. 27

Compound No. 27 was synthesized as follows in accordance with reaction scheme:

[Formula 97]

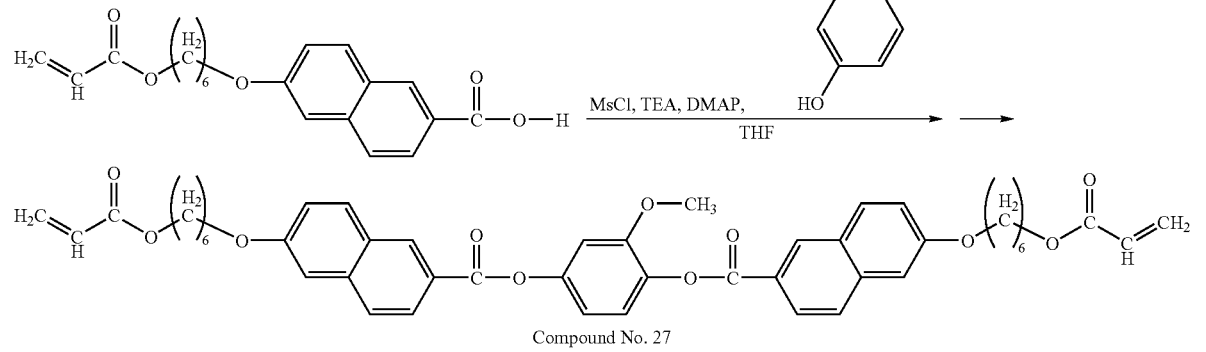

Compound No. 27

MsCl: methanesulfonyl chloride TEA: triethylamine DMAP: 4-dimethylaminopyridine
THF: tetrahydrofuran In a nitrogen atmosphere, 13.70 g (40.00 mmol) of 6-(6-acryloyloxyhexyloxy)naphthalene-2-carboxylic acid was dissolved in 60 g of tetrahydrofuran (THF). After the solution was cooled to −30° C., 5.50 g (48.01 mmol) of methanesulfonyl chloride (MsCl) was added to the solution, and 10.51 g of triethylamine (TEA) was added thereto dropwise, followed by stirring for 1 hour. To the mixture were added 0.02 g of 4-dimethylaminopyridine (DMAP) and 2.80 g (19.98 mmol) of methoxyhydroquinone, followed by stirring for 1 hour while maintaining the temperature at or below 0° C. After the stirring, 60 g of ethyl acetate and 20 g of water were added to the reaction mixture to conduct oil-water separation. The organic layer was extracted and washed with water. The washed organic layer was dried over magnesium sulfate and filtered. The filtrate was concentrated under reduced pressure, and the residue was purified by column chromatography on silica gel (developing solvent: toluene), followed by crystallization from a methanol/toluene mixed solvent to give 5.6 g (36%) of white crystals, which were identified to be compound No. 27 as a result of analyses. The results of the analyses are shown below.

(1) $^1$H-NMR (400 MHz, CDCl$_3$) (ppm)

1.4-2.1 (m, 16H), 3.8 (s, 3H), 4.2 (q, 8H), 5.7-6.5 (m, 6I-1), 6.9-7.3 (m, 7H), 7.8 (t, 4H), 8.1 (d, 2H), 8.7 (s, 2H)

(2) IR (KBr tablet method) (cm$^{-1}$)

475, 583, 745, 810, 853, 945, 1034, 1061, 1173, 1273, 1342, 1389, 1470, 1508, 1624, 1728, 2862, 2939

(3) Phase transition temperature

The compound was analyzed on a differential scanning calorimeter Thermo Plus DSC-8230 from Rigaku Corp. under conditions of a nitrogen atmosphere (50 ml/min), a heating rate of 5° C./min, and a measuring temperature of from room temperature (20° to 30° C.) up to 150° C. As a result, the following phase transition temperature was confirmed.

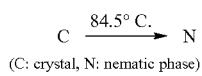

(C: crystal, N: nematic phase)

Synthesis Example 8

Preparation of Compound No. 40

Compound No. 40 was synthesized as follows in accordance with reaction scheme:

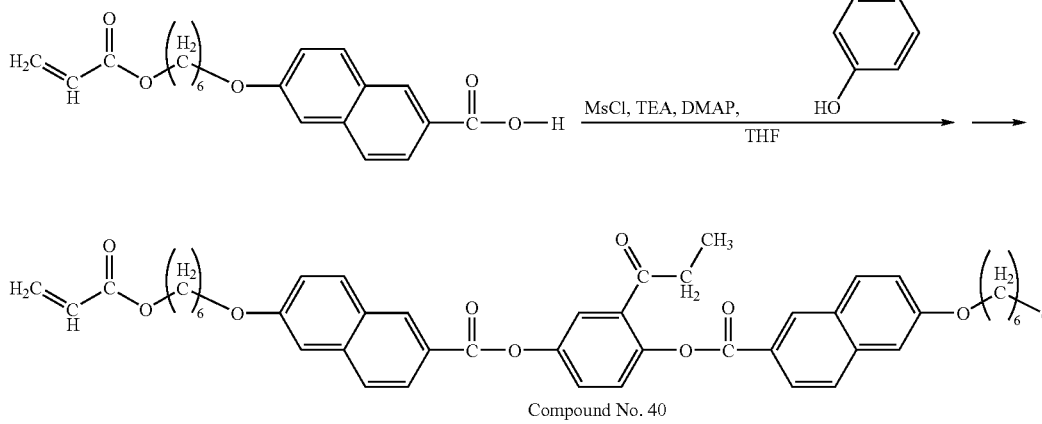

MsCl: methanesulfonyl chloride TEA: triethylamine DMAP: 4-dimethylaminopyridine
THF: tetrahydrofuran In a nitrogen atmosphere, 13.70 g (40.00 mmol) of 6-(6-acryloyloxyhexyloxy)naphthalene-2-carboxylic acid was dissolved in 60 g of tetrahydrofuran (THF). After the solution was cooled to −30° C., 5.50 g (48.01 mmol) of methanesulfonyl chloride (MsCl) was added to the solution, and 10.51 g of triethylamine (TEA) was added thereto dropwise, followed by stirring for 1 hour. To the mixture were added 0.02 g (0.15 mmol) of 4-dimethylaminopyridine (DMAP) and 3.32 g (19.98 mmol) of 2,5-dihydroxyphenyl ethyl ketone, followed by stirring for 1 hour while maintaining the temperature at or below 0° C. After the stirring, 40 g of ethyl acetate and 20 g of water were added to the reaction mixture to conduct oil-water separation. The organic layer was extracted and washed with water. The washed organic layer was dried over magnesium sulfate and filtered. The filtrate was concentrated under reduced pressure, and the residue was purified by column chromatography on silica gel (developing solvent: toluene), followed by crystallization from a methanol/toluene mixed solvent to give 8.6 g (53%) of white crystals, which were identified to be compound No. 40 as a result of analyses. The results of the analyses are shown below.

(1) $^1$H-NMR (400 MHz, CDCl$_3$) (ppm)
1.1 (t, 3H), 1.4-2.0 (m, 16H), 2.9 (q, 2H), 4.2 (q, 8H), 5.7-6.5 (m, 6H), 7.2-8.2 (m, 15H), 6.7 (s, 2H)

(2) IR (KBr tablet method) (cm$^{-1}$)
478, 745, 810, 872, 937, 988, 1061, 1123, 1180, 1273, 1342, 1389, 1412, 1470, 1624, 1690, 1742, 2862, 2939

(3) Phase transition temperature

The compound was analyzed on a differential scanning calorimeter Thermo Plus DSC-8230 from Rigaku Corp. under conditions of a nitrogen atmosphere (50 ml/min), a heating rate of 5° C./min, and a measuring temperature of from room temperature (20° to 30° C.) up to 150° C. As a result, the following phase transition temperature was confirmed.

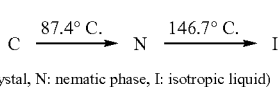

(C: crystal, N: nematic phase, I: isotropic liquid)

Synthesis Example 9

Preparation of Compound No. 47

Compound No. 47 was synthesized as follows in accordance with reaction scheme:

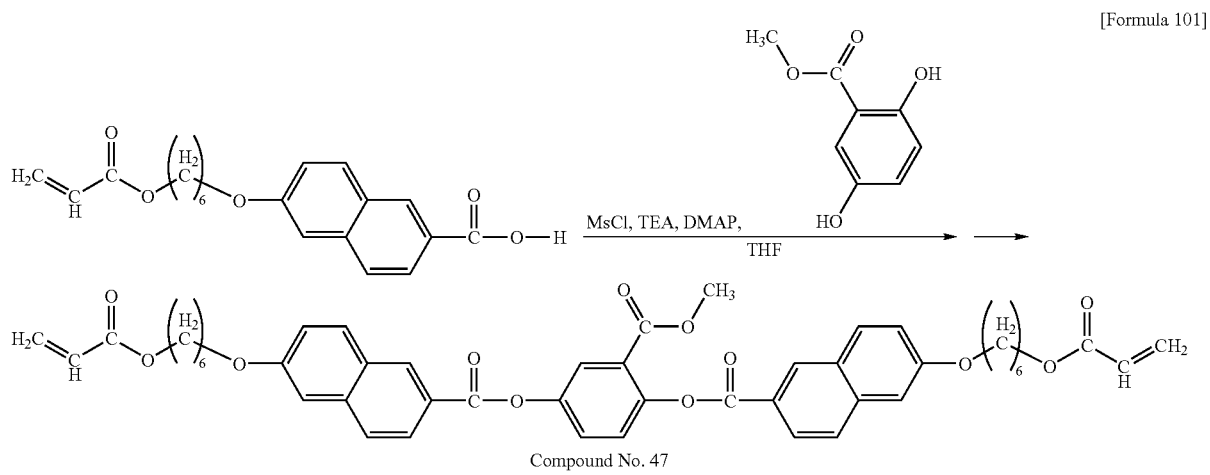

Compound No. 47

MsCl: methanesulfonyl chloride  TEA: triethylamine  DMAP: 4-dimethylaminopyridine
THF: tetrahydrofuran In a nitrogen atmosphere, 13.70 g (40.00 mmol) of 6-(6-acryloyloxyhexyloxy)naphthalene-2-carboxylic acid was dissolved in 60 g of tetrahydrofuran (THF). After the solution was cooled to −30° C., 5.50 g (48.01 mmol) of methanesulfonyl chloride (MsCl) was added to the solution, and 10.51 g of triethylamine (TEA) was added thereto dropwise, followed by stirring for 1 hour. To the mixture were added 0.02 g (0.15 mmol) of 4-dimethylaminopyridine (DMAP) and 3.36 g (19.98 mmol) of methyl-2,5-dihydroxybenzoate, followed by stirring for 1 hour while maintaining the temperature at or below 0° C. After the stirring, 40 g of ethyl acetate and 20 g of water were added to the reaction mixture to conduct oil-water separation. The organic layer was extracted and washed with water. The washed organic layer was dried over magnesium sulfate and filtered. The filtrate was concentrated under reduced pressure, and the residue was purified by column chromatography on silica gel (developing solvent: toluene), followed by crystallization from a methanol/toluene mixed solvent to give 8.6 g (53%) of white crystals, which were identified to be compound No. 47 as a result of analyses. The results of the analyses are shown below.

(1) $^1$H-NMR (400 MHz, CDCl$_3$) (ppm)
1.5-2.0 (m, 16H), 3.7 (s, 3H), 4.2 (q, 8H), 5.7-6.5 (m, 6H), 7.3-8.2 (m, 15H), 8.7 (s, 2H)

(2) IR (KBr tablet method) (cm$^{-1}$)
475, 548, 586, 675, 741, 772, 810, 856, 876, 914, 941, 980, 1015, 1057, 1126, 1169, 1200, 1277, 1342, 1389, 1408, 1435, 1470, 1624, 1720, 1732, 2862, 2947, 3063

(3) Phase transition temperature
The compound was analyzed on a differential scanning calorimeter Thermo Plus DSC-8230 from Rigaku Corp. under conditions of a nitrogen atmosphere (50 ml/min), a heating rate of 5° C./min, and a measuring temperature of from room temperature (20° to 30° C.) up to 150° C. As a result, the following phase transition temperature was confirmed.

(C: crystal, N: nematic phase)

Synthesis Example 10

Preparation of Compound No. 59

Compound No. 59 was synthesized as follows in accordance with reaction scheme:

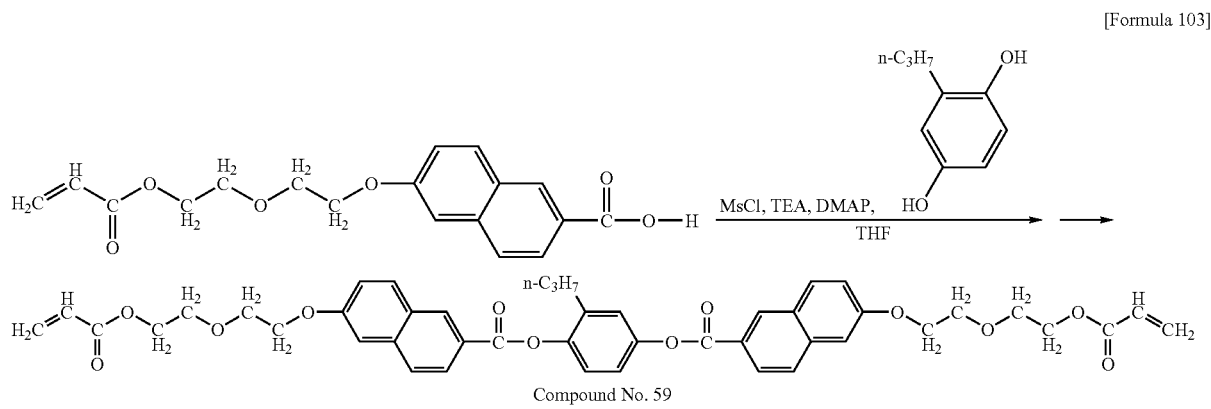

Compound No. 59

MsCl: methanesulfonyl chloride  TEA: triethylamine  DMAP: 4-dimethylaminopyridine
THF: tetrahydrofuran In a nitrogen atmosphere, 5 g (15.14 mmol) of 6-(2-(2-acryloyloxyethoxy)ethoxy)naphthalene-2-carboxylic acid was dissolved in 20 g of tetrahydrofuran (THF). After the solution was cooled to −30° C., 1.91 g (16.67 mmol) of methanesulfonyl chloride (MsCl) was added to the solution, and 4.12 g of triethylamine (TEA) was added thereto dropwise, followed by stirring for 1 hour. To the mixture were added 0.02 g (0.15 mmol) of 4-dimethylaminopyridine (DMAP) and 1.04 g (6.83 mmol) of propylhydroquinone, followed by stirring for 1 hour while maintaining the temperature at or below 0° C. After the stirring, 40 g of ethyl acetate and 20 g of water were added to the reaction mixture to conduct oil-water separation. The organic layer was extracted and washed with water. The washed organic layer was dried over magnesium sulfate and filtered. The filtrate was concentrated under reduced pressure, and the residue was purified by column chromatography on silica gel (developing solvent: toluene/ethyl acetate mixed solvent) to yield 2.2 g (41%) of white crystals, which were identified to be compound No. 59 as a result of analyses. The results of the analyses are shown below.

(1) $^1$H-NMR (400 MHz, CDCl$_3$) (ppm)

0.94 (t, 3H), 1.69 (q, 2H), 2.63 (t, 2H), 3.74-4.02 (m, 8H), 4.20-4.50 (m, 8H), 5.70-6.60 (m, 6H), 7.06-7.40 (m, 7H), 7.81 (dd, 2H), 7.91 (d, 2H), 8.18 (dd, 2H), 8.71 (s, 2H)

(2) IR (KBr tablet method) (cm$^{-1}$)

478, 748, 810, 949, 1069, 1142, 1169, 1196, 1277, 1408, 1477, 1624, 1724, 2878, 3433

(3) Phase transition temperature

The compound was analyzed on a differential scanning calorimeter Thermo Plus DSC-8230 from Rigaku Corp. under conditions of a nitrogen atmosphere (50 ml/min), a heating rate of 5° C./min, and a measuring temperature of from room temperature (20° to 30° C.) up to 150° C. As a result, the following phase transition temperature was confirmed.

[Formula 104]

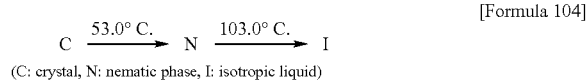

(C: crystal, N: nematic phase, I: isotropic liquid)

Preparation Example 1

Preparation of Polymers

Polymers were obtained from the polymerizable compositions of the invention in accordance with the following procedures; (1) preparation of a sample, (2) preparation of a substrate, and (3) application to the substrate.

(1) Preparation of Polymerization Composition Solution

Each of the polymerizable compositions shown in Table 1 below weighing 1.0 g was dissolved in 4.0 g of a solvent (cyclohexanone/2-butanone=1/1 by mass), and 0.03 g of a radical polymerization initiator (N-1919, from ADEKA Corp.) was added and completely dissolved therein. The solution was filtered through a filter with a pore size of 0.45 μm to prepare a polymerizable composition solution.

(2) Preparation of Substrate

A glass plate was cleaned with a mild detergent, rinsed with pure water, and dried. A 5% aqueous solution of polyvinyl alcohol was uniformly applied to the glass plate with a spin coater and dried at 100° C. for 3 minutes. The polyvinyl alcohol film thus formed on the substrate was rubbed with a rayon cloth in a given direction to prepare a substrate.

(3) Application to Substrate

Each of the polymerizable composition solutions prepared in (1) above was applied to the substrate prepared in (2) above with a spin coater. The speed and time of rotation of the spin coater were adjusted so as to give a coating film thickness of about 1.0 μm. The coating film was dried on a hot plate at 100° C. for 3 minutes, allowed to cool at room temperature for 3 minutes, and irradiated with light of a high pressure mercury lamp (120 W/cm$^2$) for 20 seconds to polymerize and cure.

Examples 1 and 2 and Comparative Examples 1 to 3

The polymers obtained above were evaluated as follows. The results obtained are shown in Table 1.

(1) Surface Condition

The surface of the resulting polymer film was observed with the naked eye and graded "good" (smooth surface), "medium" (non-uniformity or tackiness on part of the surface), or "poor" (rough surface or cloudiness).

(2) Uniformity of Alignment

Uniformity of the polymer film was evaluated using a polarizing microscope. A sample was mounted on the rotating stage between crossed polarizers, and the stage was rotated to observe the alignment state of the polymer, from which the film homogeneity was evaluated. A sample showing uniform alignment was rated "good", non-uniform alignment "medium", or no alignment due to, e.g., crystallization "poor".

(3) Retardation (R)

The retardation (R) at 546 nm of the polymers obtained in Preparation Example 1 was determined in accordance with the Senarmont method using a polarizing microscope at room temperature (25° C.).

(4) Thickness (d)

The thickness (d) of the resulting polymer film was measured with a contact stylus profilometer (Dektak6M from Ulvac Inc.) at room temperature (25° C.).

(5) Optical (Refractive Index) Anisotropy (Δn)

The optical (refractive index) anisotropy of the polymer was calculated by replacing retardation (R) and thickness (d) in the following formula (3) with the values measured above.

Optical(refractive index)anisotropy(Δ$n$)=retardation ($R$)/thickness($d$)   (3)

TABLE 1

| | Example | | Comparative Example | | |
| | 1 | 2 | 1 | 2 | 3 |
|---|---|---|---|---|---|
| Polymerizable Composition (part by mass): | | | | | |
| Compound No. 18 | 100 | | | | |
| Compound No. 40 | | 100 | | | |
| Comparative Compound 1[1) ] | | | 100 | | |
| Comparative Compound 2[2) ] | | | | 100 | |
| Comparative Compound 3[3) ] | | | | | 100 |
| Results of Evaluation: | | | | | |

TABLE 1-continued

| | Example | | Comparative Example | | |
|---|---|---|---|---|---|
| | 1 | 2 | 1 | 2 | 3 |
| Surface Condition | good | good | poor[4] (not dissolved) | poor[3] (cloudy, precipitated) | medium[6] (tacky) |
| Alignment Uniformity | good | good | — | poor | medium[6] (partly nonuniform) |
| Retardation (R) (nm) | 285 | 287 | — | — | 146 |
| Thickness (d) (μm) | 1.27 | 1.26 | — | — | 1.30 |
| Optical (Refractive Index) Anisotropy (Δn) | 0.224 | 0.228 | — | — | 0.122 |

1) Comparative compound 1

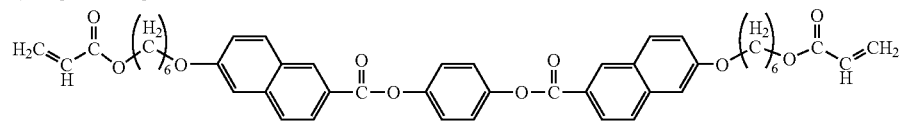

2) Comparative compound 2

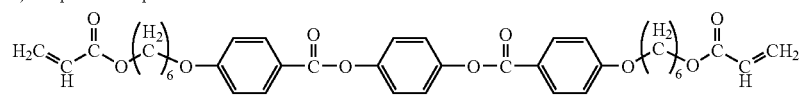

3) Comparative compound 3

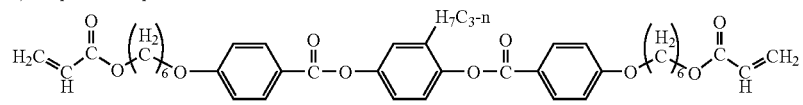

4) Comparative compound 1 did not dissolve.
5) Comparative compound 2 precipitated on the surface to cause cloudiness.
6) The alignment was nonuniform, and the cure was insufficient.

As shown in Table 1, comparative compound 1 and comparative compound 2, which are not the polymerizable compounds of the invention, did not dissolve in the solvent or did not exhibit a liquid crystal phase at or near room temperature, resulting in a failure to have a fixed liquid crystal phase. The polymer obtained by using comparative compound 3 as a polymerizable compound was capable of liquid crystal phase fixation but underwent nonuniformity of alignment in part of the film surface and was not satisfactory in terms of optical characteristics including retardation and optical (refractive index) anisotropy (Δn).

In contrast, the polymers prepared by using the polymerizable compounds of the invention had uniform alignment and large optical (refractive index) anisotropy (Δn) as demonstrated in Examples 1 and 2.

As described, the polymer obtained by using the polymerizable compound of the invention has a well-controlled, uniform film thickness and excellent optical characteristics and is suited for use as an optical film for display devices.

INDUSTRIAL APPLICABILITY

The polymerizable compound of the invention and the polymerizable composition containing the polymerizable compound are capable of polymerizing in a liquid crystal state at or near room temperature and well soluble in a solvent. The polymer of the invention, which is obtained by photocuring the polymerizable compound or the polymerizable composition, is useful as a liquid crystal material that retains a uniform film condition and exhibits excellent alignment controllability and optical characteristics.

The invention claimed is:

1. A polymerizable compound represented by general formula (1):

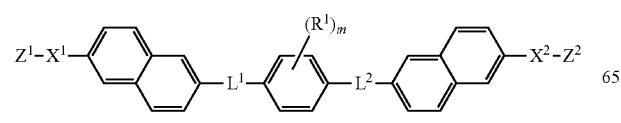

wherein,
$Z^1$—$X^1$— and $Z^2$—$X^2$— are each a structure represented by formula (2):

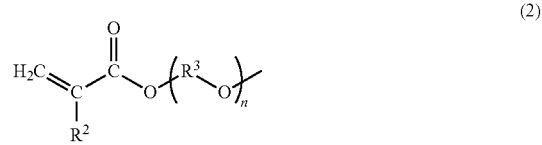

$R^2$ represents a hydrogen atom or a methyl group;
$R^3$ represents a single bond, an optionally branched alkylene group having 1 to 8 carbon atoms, or an optionally branched alkylene group having 2 to 8 carbon atoms interrupted by an ether linkage and/or an ester linkage;
n represents an integer of 1 to 5; and
when n is 2 or greater, then each $R^3$ may be the same or different;
$R^1$ represents —R', —OR', —CO—R', or —OCO—R';
R' represents a halogen atom, an optionally branched alkyl group having 1 to 8 carbon atoms, or a 6-membered ring optionally having a substituent, wherein the alkyl group may have its —CH$_2$— moiety replaced with a sulfur atom or an oxygen atom and may have its hydrogen atom replaced with a halogen atom or a nitrile group;
the substituent is selected from a hydrogen atom, a halogen atom, a nitrile group, an optionally branched alkyl group having 1 to 8 carbon atoms, an optionally branched alkoxy group having 1 to 8 carbon atoms, and an optionally branched alkenyl group having 2 to 8 carbon atoms, wherein the alkyl, alkoxy or alkenyl group may have its —CH$_2$— moiety replaced with a sulfur atom or an oxygen atom and may have its hydrogen atom replaced with a halogen atom or a nitrile group;
$L^1$ and $L^2$ each independently represent a member selected from a single bond, —CH$_2$CH$_2$—, —CH=CH—, —C≡C—, —CH$_2$O—, —OCH$_2$—, —COO—, and —OCO—;

m represents an integer of 1 to 4; and each $R^1$ may be the same or different.

2. The polymerizable compound according to claim 1, wherein $L^1$ is —COO—, and $L^2$ is —OCO—.

3. A polymerizable composition comprising the polymerizable compound according to claim 1.

4. The polymerizable composition according to claim 3, further comprising a liquid crystal compound.

5. The polymerizable composition according to claim 3, further comprising an optically active compound and having a cholesteric liquid crystal phase.

6. The polymerizable composition according claim 3, further comprising a radical polymerization initiator.

7. A polymer obtained by photopolymerizing the polymerizable composition according to claim 3.

8. The polymer according to claim 7, having optical anisotropy.

9. An optical film for a display device, comprising the polymer according to claim 7.

10. A polymerizable composition comprising the polymerizable compound according to claim 2.

11. The polymerizable composition according to claim 4, further comprising an optically active compound and having a cholesteric liquid crystal phase.

12. The polymerizable composition according claim 4, further comprising a radical polymerization initiator.

13. The polymerizable composition according claim 5, further comprising a radical polymerization initiator.

14. A polymer obtained by photopolymerizing the polymerizable composition according to claim 4.

15. A polymer obtained by photopolymerizing the polymerizable composition according to claim 5.

16. A polymer obtained by photopolymerizing the polymerizable composition according to claim 6.

17. An optical film for a display device, comprising the polymer according to claim 8.

* * * * *